United States Patent
Fairfield et al.

(10) Patent No.: US 11,851,082 B2
(45) Date of Patent: Dec. 26, 2023

(54) KINEMATIC MODEL FOR AUTONOMOUS TRUCK ROUTING

(71) Applicant: WAYMO LLC, Mountain View, CA (US)

(72) Inventors: Nathaniel Fairfield, Mountain View, CA (US); Benjamin Pitzer, East Palo Alto, CA (US); Austin Abrams, Redwood City, CA (US); Christopher Bowen, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 119 days.

(21) Appl. No.: 17/120,353

(22) Filed: Dec. 14, 2020

(65) Prior Publication Data

US 2021/0197852 A1     Jul. 1, 2021

Related U.S. Application Data

(60) Provisional application No. 62/954,870, filed on Dec. 30, 2019.

(51) Int. Cl.
*B60W 60/00* (2020.01)
*B60W 30/18* (2012.01)
(Continued)

(52) U.S. Cl.
CPC .... *B60W 60/001* (2020.02); *B60W 30/18163* (2013.01); *B60W 40/04* (2013.01); *G01C 21/3453* (2013.01); *B60W 2556/50* (2020.02)

(58) Field of Classification Search
CPC ......... B60W 60/001; B60W 30/18163; B60W 40/04; B60W 2556/50; G01C 21/3453
See application file for complete search history.

(56) References Cited

U.S. PATENT DOCUMENTS 6,681,175 B2   1/2004  MacPhail et al.
9,340,228 B2   5/2016  Xu et al.
(Continued)

FOREIGN PATENT DOCUMENTS

WO      2018086764 A1     5/2018

OTHER PUBLICATIONS

"How Self-Driving Trucks Really Work | Future of Work (HBO)", 2019, p. 1, Retrieved from the Internet: URL:https://www.youtube.com/watch?v=Qs69m9T-4Rk.
(Continued)

*Primary Examiner* — Jeff A Burke
*Assistant Examiner* — Mohamad O El Sayah
(74) *Attorney, Agent, or Firm* — Botus Churchill IP Law LLP

(57) ABSTRACT

The technology relates to route planning and performing driving operations in autonomous vehicles, such as cargo trucks, articulating buses, as well as other vehicles. A detailed kinematic model of the vehicle in evaluated in conjunction with roadgraph and other information to determine whether a route or driving operation is feasible for the vehicle. This can include evaluating a hierarchical set of driving rules and whether current driving conditions impact any of the rules. Driving trajectories and cost can be evaluated when pre-planning a route for the vehicle to follow. This can include determining an ideal trajectory for the vehicle to take a particular driving action. Pre-planned routes may be shared with a fleet of vehicles, and can be modified based on information obtained by different vehicles of the fleet.

23 Claims, 25 Drawing Sheets

(51) Int. Cl.
*B60W 40/04* (2006.01)
*G01C 21/34* (2006.01)

(56) References Cited

U.S. PATENT DOCUMENTS

| | | |
|---|---|---|
| 9,849,878 B2 | 12/2017 | Lee et al. |
| 2017/0247054 A1* | 8/2017 | Lee .................. B62D 13/00 |
| 2017/0269591 A1 | 9/2017 | Tanaka et al. |
| 2018/0129220 A1* | 5/2018 | Beach ................ G05D 1/0274 |
| 2018/0143643 A1* | 5/2018 | Fairfield ............ G01C 21/3469 |
| 2018/0259957 A1* | 9/2018 | Charrow ............. G05D 1/0088 |
| 2018/0356819 A1* | 12/2018 | Mahabadi ............ B60W 30/08 |
| 2019/0118814 A1 | 4/2019 | Wood et al. |
| 2019/0186947 A1* | 6/2019 | Rockmore ............ B60W 60/00 |
| 2019/0235504 A1 | 8/2019 | Carter et al. |
| 2019/0265695 A1* | 8/2019 | Udagawa ............ G05D 1/0274 |
| 2019/0286151 A1* | 9/2019 | Palanisamy ...... G08G 1/096816 |
| 2019/0369637 A1 | 12/2019 | Shalev-Shwartz et al. |
| 2020/0200553 A1* | 6/2020 | Voznesensky ........ B60W 40/06 |
| 2020/0290619 A1* | 9/2020 | Mehdi ............... B60W 60/0011 |
| 2021/0041255 A1* | 2/2021 | Schein .............. G01C 21/3461 |

OTHER PUBLICATIONS

The Extended European Search Report for European Patent Application No. 20212784.1, dated Sep. 23, 2021.
Vanholme, "Highly Automated Driving on Highways Based on Legal Safety", Dissertation, 2012, pp. 1-191.
Beyersdorfer, Susann, et al, Novel Model Based Path Planning for Multi-Axle Steered Heavy Load Vehicles, Oct. 6-9, 2013, pp. 424-429, Proceed. of the 16th International IEEE Annual Conf. on Intelligent Trans. Systems (ITSC 2013), The Hague, The Netherlands.
Cariou, Christophe, Autonomous maneuver of a farm vehicle with a trailed implement: motion planner and lateral-longitudinal controllers, May 3-8, 2010, pp. 3819-3824, 2010 IEEE Int. Conf. on Robotics and Auto., Anchorage Conv. Dist., Anchorage, Alaska USA.
Currier, Patrick Norman, A Method for Modeling and Prediction of Ground Vehicle Dynamics and Stability in Autonomous Systems, May 6, 2011, 229 pp., Copyright 2011.
Khalaji, Ali Keymasi, et al Robust Adaptive Controller for a Tractor-Trailer Mobile Robot, Jun. 2014, pp. 943-953, vol. 19, No. 3, IEEE/ASME Transaction on Mechatronics.
Li, Bai, Time-Optimal Trajectory Planning for Tractor-Trailer Vehicles via Simultaneous Dynamic Optimization, Sep. 28-Oct. 2, 2015, pp. 3844-3849, IEEE/RSJ International Conf. on Intelligent Robots and Systems (IROS), Congress Center Hamburg, Germany.
Stahn, Roland et al. Laser Scanner-Based Navigation for Commercial Vehicles, Jun. 13-15, 2007, pp. 969-974, Proceedings of the 2007 IEEE Intelligent Vehicles Symposium, Istanbul, Turkey.
Stahn, Roland, et al, Laser Scanner-Based Navigation and Motion Planning for Truck-Trailer Combinations, Copyright 2007, 6 pp., Daim.Chrys. AG, Grp. Res., Assis. and Safety Sys., Berlin, Germany, Tech. Univ. of Berlin, Comp. Vision and Remote Sensing Group.
Tilbury, Dawn, et al, A Multisteering Trailer System: Conversion into Chained Form Using Dynamic Feedback, Dec. 8, 1995, pp. 807-818, vol. 11, No. 6, IEEE Transactions on Robotics and Automation.

* cited by examiner

300

320

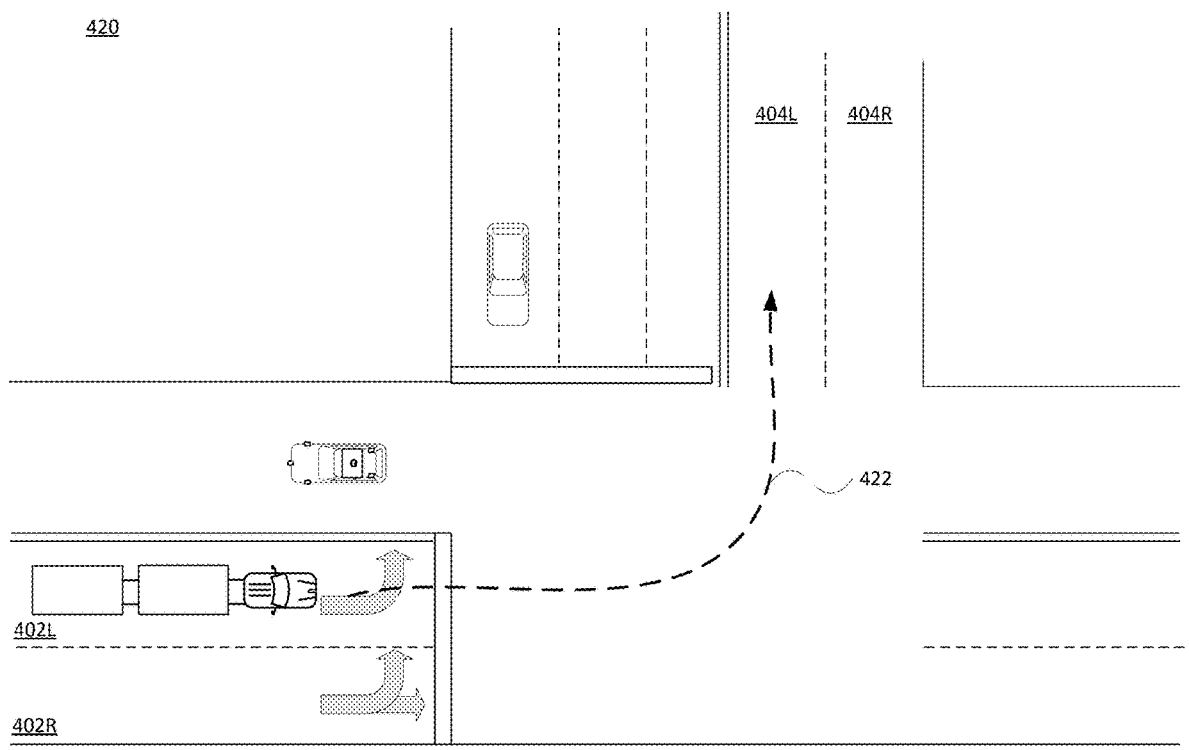

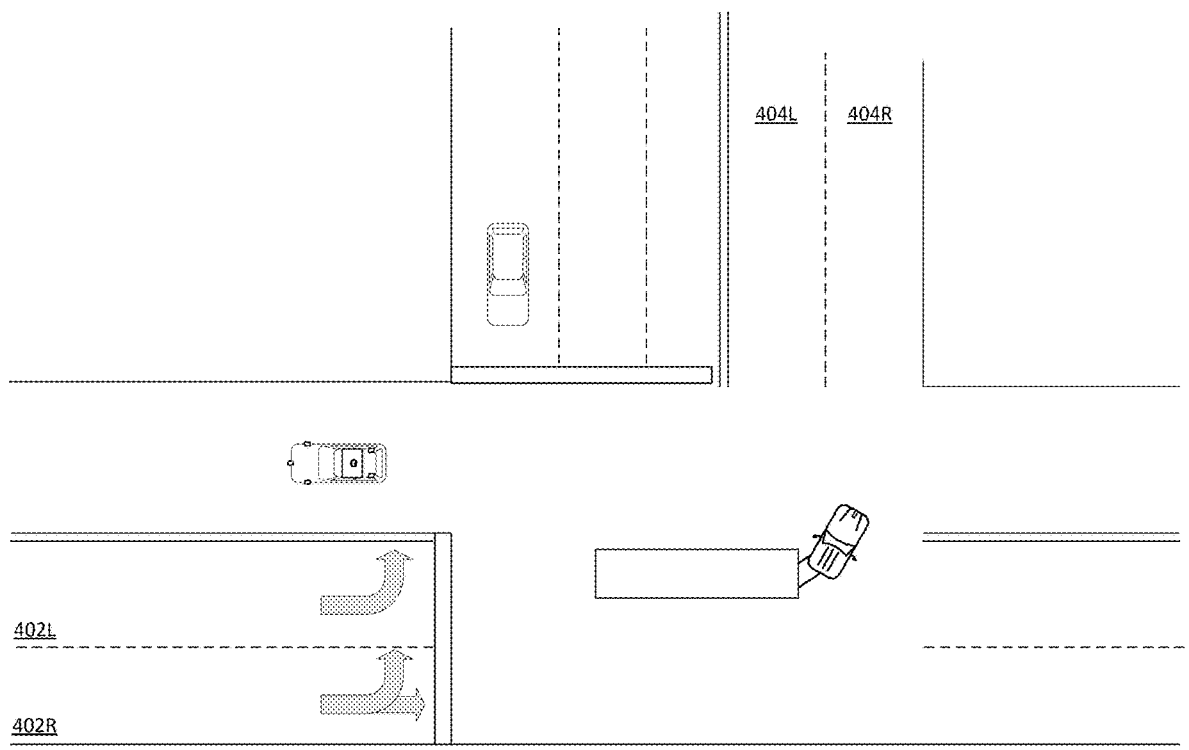

600

610

620

630

640

650

*Road Limitations*
- Driving along edge of road – depends on surface type (e.g., gravel v. grass)

800

810

*Road Limitations*
- Disallow routes that explicitly prohibit trucks
- Disallow routes that may have conditional limits (weight, height, time of day)

820

900

910

1100

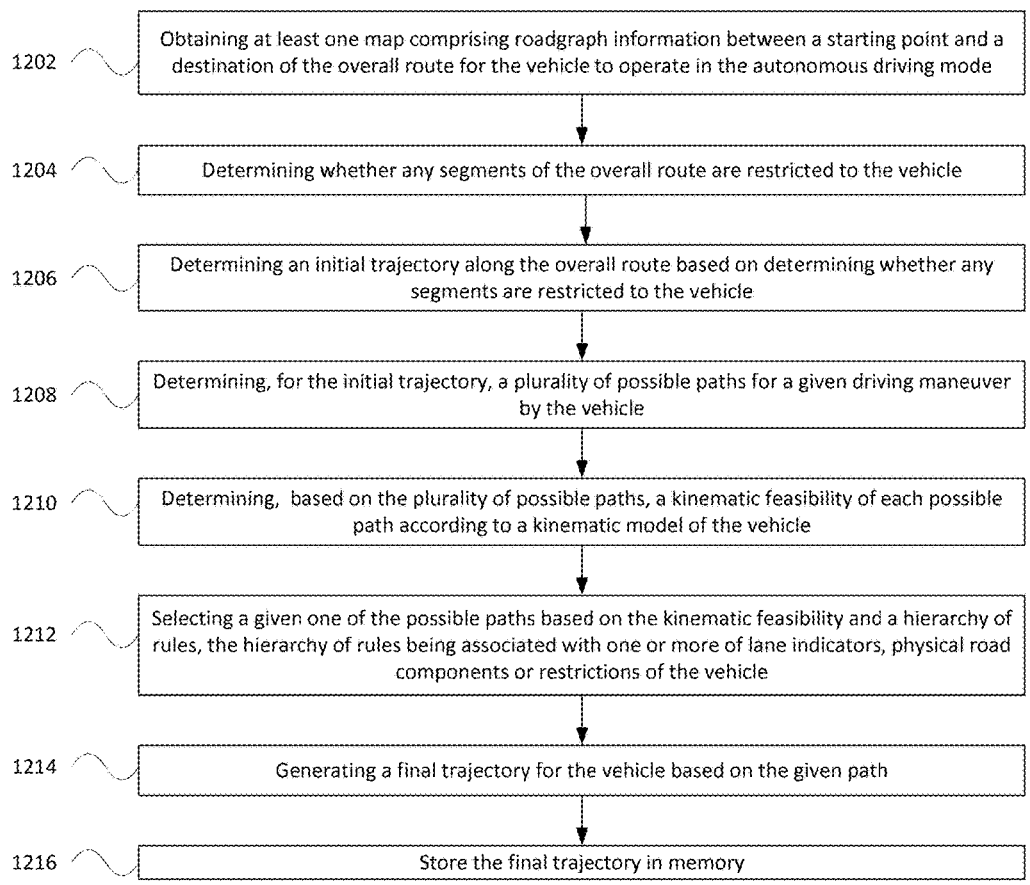

KINEMATIC MODEL FOR AUTONOMOUS TRUCK ROUTING

CROSS-REFERENCE TO RELATED APPLICATIONS

This application claims the benefit of the filing date of U.S. Provisional Application No. 62/954,870, filed Dec. 30, 2019, the entire disclosure of which is incorporated by reference herein.

BACKGROUND

Autonomous vehicles, such as vehicles that do not require a human driver, can be used to aid in the transport of trailered (e.g., towed) cargo, such as freight, livestock or other items from one location to another. Other types of articulated vehicles may also transport cargo or passengers. Such vehicles may operate in a fully autonomous mode without any in-vehicle passenger input or a partially autonomous mode where a person may provide some driving input. One or more sensors can be used to detect nearby objects in the environment, and the vehicle may use information from the sensors when driving in an autonomous mode. Depending on the size and shape of the vehicle and configuration of the roadway, it may be challenging for the vehicle to make a turn or perform another driving operation. Such operations may be further complicated by vehicle weight or size limitations, as well as other constraints on how the vehicle may maneuver autonomously. These issues can prevent vehicles from taking particular routes, may delay cargo delivery, increase traffic and create other logistical problems for the autonomous vehicle and other road users.

BRIEF SUMMARY

The technology relates to using a detailed kinematic model of a cargo truck or other vehicle in conjunction with roadgraph and other information to determine whether a route is feasible for the vehicle. This can include evaluating a hierarchical set of driving rules and determining whether any of the rules can be broken given current driving conditions. Aspects of the technology relate to determining an ideal trajectory (and cost) for the truck to make a given turn or other driving operation, and determining an overall route from a departure point to the destination.

According to one aspect, a method of operating a vehicle in an autonomous driving mode is provided. The method comprises receiving, by one or more processors of the vehicle, sensor data of the environment around the vehicle from one or more sensors of the vehicle; determining, by the one or more processors, a plurality of possible paths for a given driving maneuver in order to follow a planned trajectory along a route; determining, by the one or more processors based on the received sensor data and the plurality of possible paths, a kinematic feasibility of each possible path according to a kinematic model of the vehicle; selecting, by the one or more processors, a given one of the possible paths based on the kinematic feasibility and a hierarchy of stored rules, the hierarchy of stored rules being associated with one or more of lane indicators, physical road components or restrictions of the vehicle; and causing the vehicle to perform a selected driving operation in the autonomous driving mode to follow the given path in accordance with the kinematic feasibility and the hierarchy of stored rules.

The kinematic feasibility may be determined according to a swept volume of the vehicle in accordance with each possible path. The swept volume can include one or more articulating sections of the vehicle.

The hierarchy of stored rules may rank one or more of different lane line types, curb configurations or road shoulder types. Selecting the given path based on the hierarchy of stored rules may include ranking paths based on expected violation of one or more of the rules. Determining the kinematic feasibility of each possible path may include evaluating a maneuver cost associated with that path. For instance, evaluating the maneuver cost can include evaluating one or more of a number of turns, occlusions, weather limitations, neighborhood type or temporal restrictions. Evaluating the maneuver cost may alternatively or additionally include analyzing a cost for missing a turn, missing an exit, or missing a lane change.

Selecting the given path may be further based on a likelihood of the vehicle becoming stuck for one or more of the possible paths. And the method may further comprise pre-planning for when to change lanes in advance of the selected driving operation.

According to another aspect, a method of determining an overall route for a vehicle to operate in an autonomous driving mode is provided. The method comprises obtaining, by one or more processors of a computing system, at least one map comprising roadgraph information between a starting point and a destination of the overall route for the vehicle to operate in the autonomous driving mode; determining, by the one or more processors, whether any segments of the overall route are restricted to the vehicle; determining, by the one or more processors, an initial trajectory along the overall route based on determining whether any segments are restricted to the vehicle; determining, by the one or more processors for the initial trajectory, a plurality of possible paths for a given driving maneuver by the vehicle; determining, by the one or more processors based on the plurality of possible paths, a kinematic feasibility of each possible path according to a kinematic model of the vehicle; selecting, by the one or more processors, a given one of the possible paths based on the kinematic feasibility and a hierarchy of rules, the hierarchy of rules being associated with one or more of lane indicators, physical road components or restrictions of the vehicle; generating, by the one or more processors, a final trajectory for the vehicle based on the given path; and storing the final trajectory in memory.

In one example, the method further comprises transmitting the final trajectory to the vehicle for operating in the autonomous driving mode. Determining the kinematic feasibility of each possible path may include evaluating at least one of a temporal restriction or a legal restriction. Evaluating the temporal restriction may include estimating a likelihood that the vehicle will be able to perform a driving action prior to occurrence of the temporal restriction.

Determining the kinematic feasibility of each possible path may include evaluating a maneuver cost associated with that path. For instance, the maneuver cost may be based on one or more of a number of turns, occlusions, weather limitations, neighborhood type or temporal restrictions. Alternatively or additionally, the maneuver cost may include a likelihood of the vehicle becoming stuck.

The hierarchy of rules may include a set of rules relating to items or objects along the roadway. The items or objects can include one or more of different lane line types, curb configurations or road shoulder types. Selecting the given path based on the hierarchy of rules may include ranking paths based on expected violation of one or more rules in the hierarchy.

The method may further comprise receiving information about restrictions or maneuver costs from one or more other vehicles that have driven along the overall route. Here, receiving the information may include receiving information about actions either taken or attempted by a given vehicle. Alternatively or additionally, receiving the information may include receiving information observed by a given vehicle about an action taken by a different vehicle.

BRIEF DESCRIPTION OF THE DRAWINGS

FIGS. 4A-C illustrate turning examples in accordance with aspects of the disclosure.

FIGS. 5A-C illustrate self-occlusion examples in accordance with aspects of the disclosure.

FIG. 12 illustrates another method in accordance with aspects of the disclosure.

DETAILED DESCRIPTION

Overview

The technology relates to fully autonomous or semi-autonomous vehicles, including cargo vehicles (e.g., tractor-trailers) and other articulated vehicles (e.g., buses), construction or farm vehicles, as well as passenger vehicles (e.g., sedans and minivans). On-board sensors, such as lidar sensors, radar and cameras, are used to detect objects in the vehicle's environment. These sensors may also detect the real-time pose of the vehicle, including any articulated components such as a trailer.

Figure 1A:
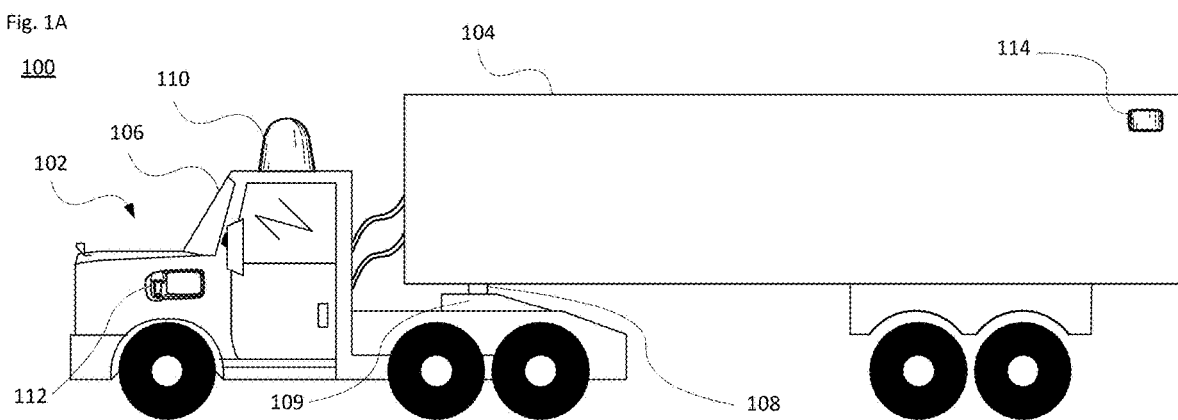
FIGS. 1A-B illustrate an example tractor-trailer arrangement for use with aspects of the technology.
Figure 1B:
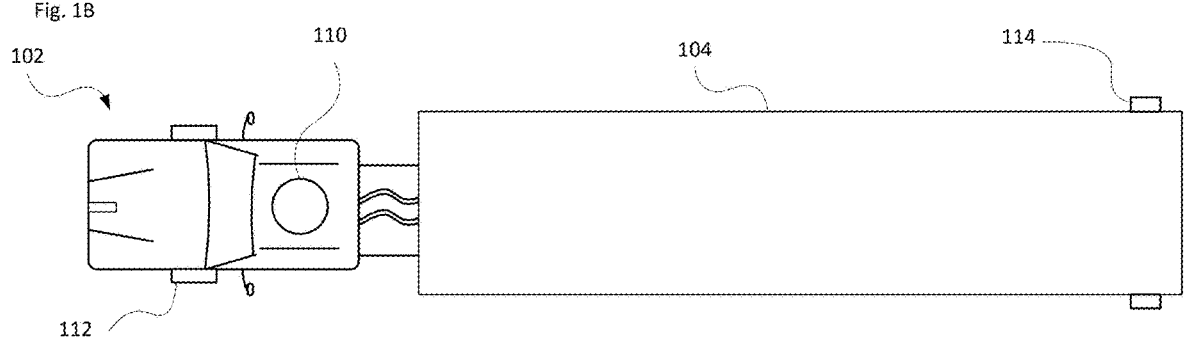

FIGS. 1A-B illustrate an example vehicle 100, such as a tractor-trailer truck. The truck may include, e.g., a single, double or triple trailer, or may be another medium or heavy duty truck such as in commercial weight classes 4 through 8. As shown, the truck includes a tractor unit 102 and a single cargo unit or trailer 104. The trailer 104 may be fully enclosed, open such as a flat bed, or partially open depending on the type of cargo to be transported. The tractor unit 102 includes the engine and steering systems (not shown) and a cab 106 for a driver and any passengers. In a fully autonomous arrangement, the cab 106 may not be equipped with seats or manual driving components, since no person may be present in on-board driving operations.

The trailer 104 includes a hitching point, known as a kingpin, 108. The kingpin 108 is typically formed as a solid steel shaft, which is configured to pivotally attach to the tractor unit 102. In particular, the kingpin 108 attaches to a trailer coupling 109, known as a fifth-wheel, that is mounted rearward of the cab. For a double or triple tractor-trailer, the second and/or third trailers may have simple hitch connections to the leading trailer. Or, alternatively, according to one aspect of the disclosure, each trailer may have its own kingpin. In this case, at least the first and second trailers could include a fifth-wheel type structure arranged to couple to the next trailer.

Figure 1C:
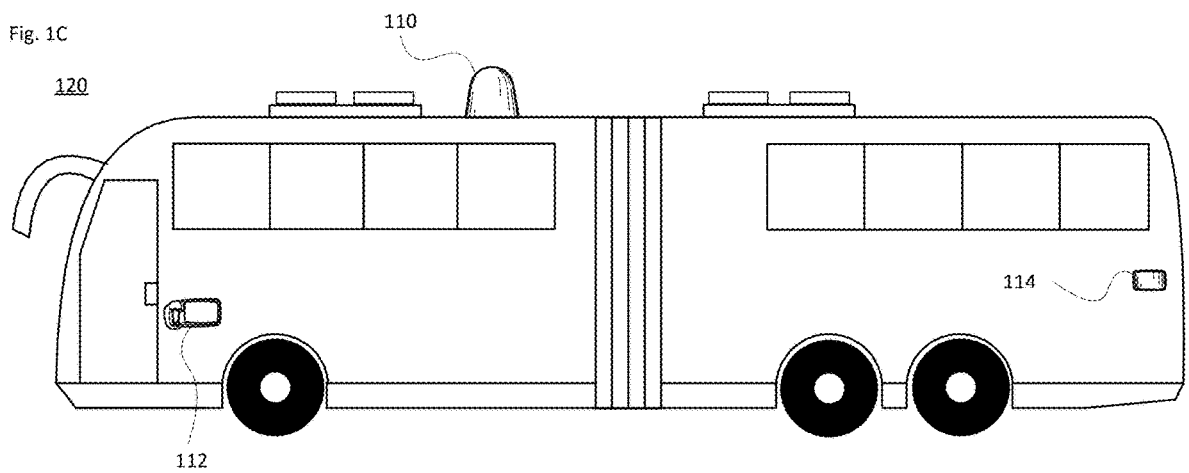
FIGS. 1C-D illustrate an example articulated bus arrangement for use with aspects of the technology.
Figure 1D:
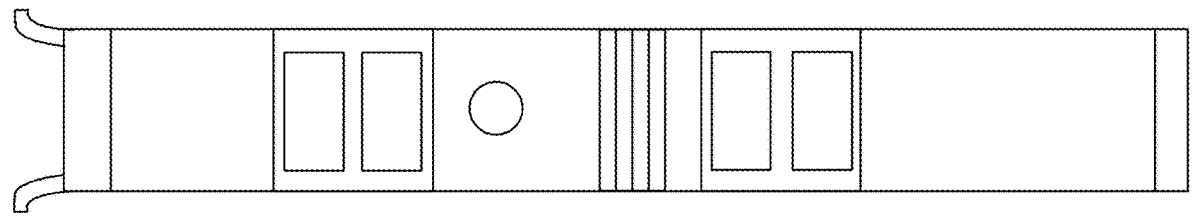

As shown, the tractor may have one or more sensor units 110, 112 disposed therealong. For instance, one or more sensor units 110 may be disposed on a roof or top portion of the cab 106, and one or more side sensor units 112 may be disposed on left and/or right sides of the cab 106. Sensor units may also be located along other regions of the cab 106, such as along the front bumper or hood area, in the rear of the cab, adjacent to the fifth-wheel, underneath the chassis, etc. The trailer 104 may also have one or more sensor units 114 disposed therealong, for instance along a side panel, front, rear, roof and/or undercarriage of the trailer 104. FIGS. 1C-D illustrate an example of another type of articulated vehicle 120, such as an articulated bus. As with the tractor-trailer 100, the articulated bus 120 may include one or more sensor units disposed along different areas of the vehicle.

By way of example, as discussed further below each sensor unit may include one or more sensors within one housing, such as lidar, radar, camera (e.g., optical or infrared), acoustical (e.g., microphone or sonar-type sensor), inertial (e.g., accelerometer, gyroscope, etc.) or other sensors.

Example Systems

Figure 2A:
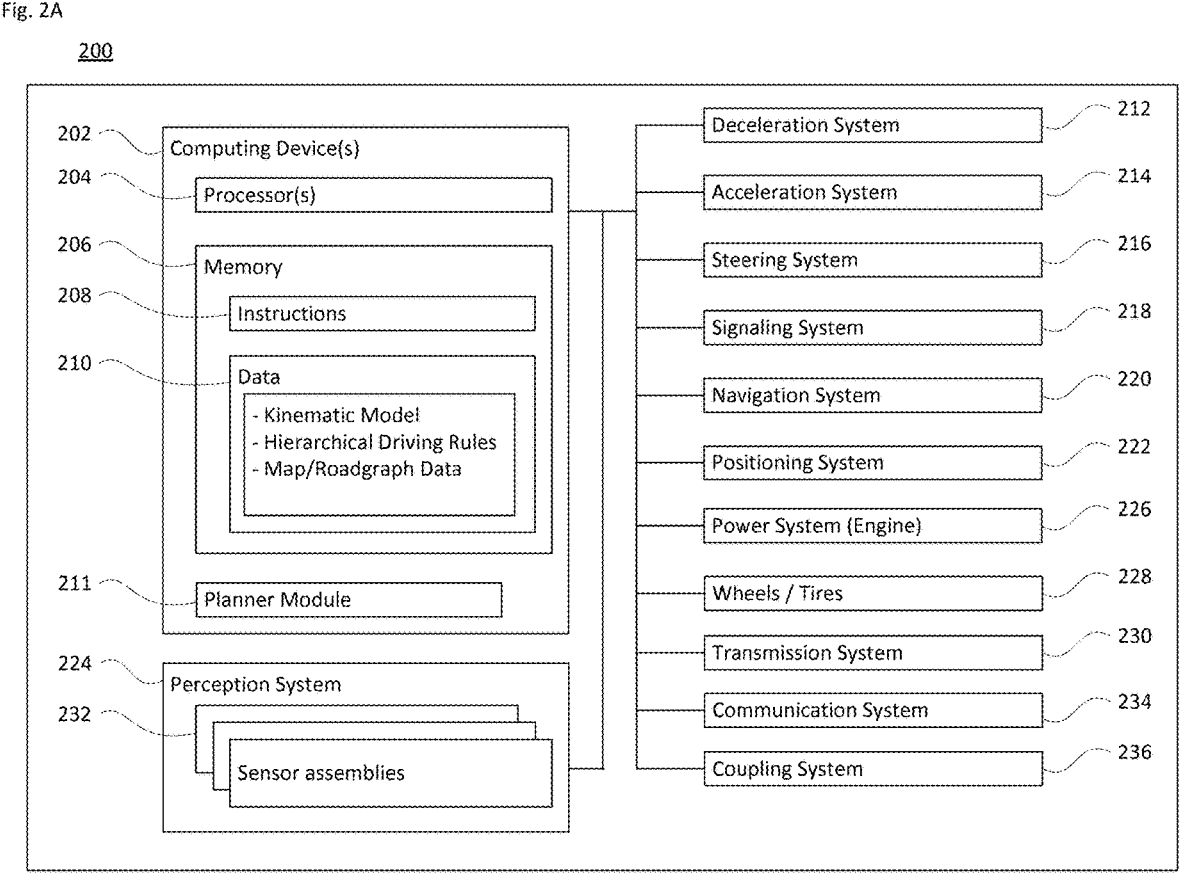
FIG. 2A illustrates a system diagram of an autonomous vehicle control system in accordance with aspects of the disclosure.

FIG. 2A illustrates a block diagram 200 with various components and systems of a vehicle, such as a truck, farm equipment, construction equipment or articulating bus, configured to operate in a fully or semi-autonomous mode of operation. By way of example, there are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. Level 2 has partial automation of certain driving operations, while Level 3 involves conditional automation that can enable a person in the driver's seat to take control as warranted. In contrast, Level 4 is a high automation level where the vehicle is able to drive without assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as "autonomous" driving modes. Thus, reference to an autonomous driving mode includes both partial and full autonomy.

As shown in the block diagram of FIG. 2A, the vehicle includes a control system of one or more computing devices, such as computing devices 202 containing one or more processors 204, memory 206 and other components typically present in general purpose computing devices. The control system may constitute an electronic control unit (ECU), e.g., of a tractor unit. The memory 206 stores information accessible by the one or more processors 204, including instructions 208 and data 210 that may be executed or otherwise used by the processor 204. The memory 206 may be of any type capable of storing information accessible by the processor, including a computing device-readable medium. The memory is a non-transitory medium such as a hard drive, memory card, optical disk, solid state device, tape memory, or the like. Systems may include different combinations of the foregoing, whereby different portions of the instructions and data are stored on different types of media.

The instructions 208 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. The data 210 may be retrieved, stored or modified by one or more processors 204 in accordance with the instructions 208. For instance, the data 210 may include a model of the vehicle, such as a kinematic model for the tractor and trailer(s) or other articulating components. Hierarchical driving rules, for instance to comply with governmental driving regulations, lane indicators and/or general "rules of the road", may also be stored in the memory. Map data, such as detailed roadgraphs, can also be stored in the memory. The computing system is able to control the overall operation of the vehicle when operating in an autonomous driving mode according to the stored data.

The one or more processor 204 may be any conventional processors, such as commercially available CPUs. Alternatively, the one or more processors may be a dedicated device such as an ASIC or other hardware-based processor, FPGA or the like. Although FIG. 2A functionally illustrates the processor(s), memory, and other elements of computing devices 202 as being within the same block, such devices may actually include multiple processors, computing devices, or memories that may or may not be stored within the same physical housing. Similarly, the memory 206 may be a hard drive or other storage media located in a housing different from that of the processor(s) 204. Accordingly, references to a processor or computing device will be understood to include references to a collection of processors or computing devices or memories that may or may not operate in parallel.

In one example, the computing devices 202 may form an autonomous driving computing system incorporated into vehicle 100 or 120. The autonomous driving computing system may be capable of communicating with various components of the vehicle in order to perform route planning and driving operations. For example, the computing devices 202 may be in communication with various systems of the vehicle, such as a driving system including a deceleration system 212 (for controlling braking of the vehicle), acceleration system 214 (for controlling acceleration of the vehicle), steering system 216 (for controlling the orientation of the wheels and direction of the vehicle), signaling system 218 (for controlling turn signals), navigation system 220 (for navigating the vehicle to a location or around objects) and a positioning system 222 (for determining the position of the vehicle). A planner module 211 may be part of the autonomous driving computer system, and used to plan routes to one or more destinations based on the kinematic model, hierarchical rules and/or map data.

The computing devices 202 are also operatively coupled to a perception system 224 (for detecting objects in the vehicle's environment), a power system 226 (for example, a battery and/or gas or diesel powered engine) and a transmission system 230 in order to control the movement, speed, etc., of the vehicle in accordance with the instructions 208 of memory 206 in an autonomous driving mode which does not require or need continuous or periodic input from a passenger of the vehicle. Some or all of the wheels/tires 228 are coupled to the transmission system 230, and the computing devices 202 may be able to receive information about tire pressure, balance and other factors that may impact driving in an autonomous mode.

The computing devices 202 may control the direction and speed of the vehicle by controlling various components. By way of example, computing devices 202 may navigate the vehicle to a destination location completely autonomously using data from the map information and navigation system 220. Computing devices 202 may use the positioning system 222 to determine the vehicle's location and the perception system 224 to detect and respond to objects when needed to reach the location safely. In order to do so, computing devices 202 may cause the vehicle to accelerate (e.g., by increasing fuel or other energy provided to the engine by acceleration system 214), decelerate (e.g., by decreasing the fuel supplied to the engine, changing gears (e.g., via the transmission system 230), and/or by applying brakes by deceleration system 212), change direction (e.g., by turning the front or other wheels of the vehicle by steering system 216), and signal such changes (e.g., by actuating turn signals of signaling system 218). Thus, the acceleration system 214 and deceleration system 212 may be a part of a drivetrain or other transmission system 230 that includes various components between an engine of the vehicle and the wheels of the vehicle. Again, by controlling these systems, computing devices 202 may also control the transmission system 230 of the vehicle in order to maneuver the vehicle autonomously.

As an example, computing devices 202 may interact with deceleration system 212 and acceleration system 214 in order to control the speed of the vehicle. Similarly, steering system 216 may be used by computing devices 202 in order to control the direction of vehicle. For example, if the vehicle is configured for use on a road, such as a tractor-trailer truck or a construction vehicle, the steering system 216 may include components to control the angle of the wheels of the tractor unit to turn the vehicle. Signaling system 218 may be used by computing devices 202 in order to signal the vehicle's intent to other drivers or vehicles, for example, by illuminating turn signals or brake lights when needed.

Navigation system 220 may be used by computing devices 202 in order to determine and follow a route to a location. In this regard, the navigation system 220 and/or data 210 may store map information, e.g., highly detailed maps that computing devices 202 can use to navigate or control the vehicle. As an example, these maps may identify the shape and elevation of roadways, lane markers, intersections, crosswalks, curbs, speed limits, traffic signal lights, buildings, signs, real time traffic information, vegetation, or other such objects and information. The lane markers may include features such as solid or broken double or single lane lines, solid or broken bicycle or bus lane lines, reflectors, etc. A given lane may be associated with left and right lane lines or other lane markers that define the boundary of the lane. Thus, most lanes may be bounded by a left edge of one lane line and a right edge of another lane line.

The perception system 224 also includes one or more sensors or other components for detecting objects external to the vehicle such as other vehicles, obstacles in the roadway, traffic signals, curbs, signs, trees, etc. For example, the perception system 224 may include one or more light detection and ranging (lidar) sensors, acoustical (e.g., microphone or sonar) devices, radar units, cameras (e.g., optical and/or infrared), inertial sensors (e.g., gyroscopes or accelerometers), pressure sensors, and/or any other detection devices that record data which may be processed by computing devices 202. The sensors of the perception system 224 may detect objects and their characteristics such as location, orientation, size, shape, type (for instance, vehicle, pedestrian, bicyclist, vegetation, etc.), heading, and speed of movement, etc. The raw data from the sensors (e.g., lidar point clouds) and/or the aforementioned characteristics can be processed locally by the perception system or may be sent for further processing to the computing devices 202 periodically or continuously as it is generated by the perception system 224. Computing devices 202 may use information from the positioning system 222 to determine the vehicle's location and the perception system 224, to detect and classify objects, and to respond to objects when needed to reach the location safely, including planning changes to the route and/or modifying driving operations.

As indicated in FIG. 2A, the perception system 224 includes one or more sensor assemblies 232. Each sensor assembly 232 may include one or more sensors at least partly received in a housing. In one example, the sensor assemblies 232 may be arranged as sensor towers integrated into the side-view mirrors on the truck, farm equipment, construction equipment, bus or the like. Sensor assemblies 232 may also be positioned at different locations on the tractor unit 102 or on the trailer 104, as noted above with regard to FIGS. 1A-B, or on articulated parts of the vehicle as shown in FIGS. 1C-D. The computing devices 202 may communicate with the sensor assemblies located anywhere on the vehicle. Each assembly may have one or more types of sensors such as those described above.

Also shown in FIG. 2A is a communication system 234. The communication system 234 may include one or more wireless connections to facilitate communication with other computing devices, such as passenger computing devices within the vehicle, and computing devices external to the vehicle, such as in another nearby vehicle on the roadway or a remote server system. The wireless connections may include short range communication protocols such as Bluetooth™ or Bluetooth™ low energy (LE), cellular connections, etc. Various configurations and protocols may be employed, such as Ethernet, WiFi and HTTPS, for communication via the Internet, intranets, virtual private networks, wide area networks, local networks, private networks using communication protocols proprietary to one or more companies, and various combinations of the foregoing.

FIG. 2A also illustrates a coupling system 238 for connectivity between the tractor unit and the trailer. For instance, the coupling system 238 can include one or more power and/or pneumatic connections and a fifth-wheel at the tractor unit for connection to the kingpin at the trailer.

Figure 2B:
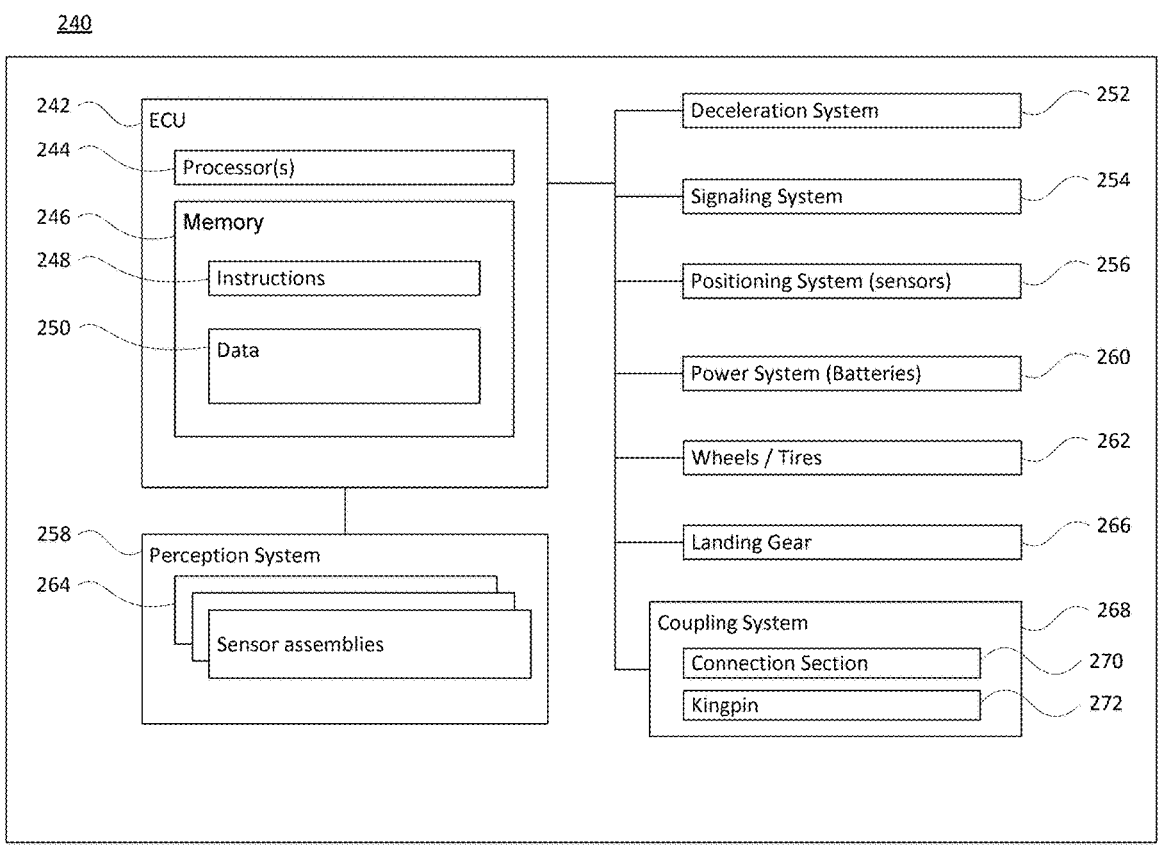
FIG. 2B illustrates a system diagram of a trailer, in accordance with aspects of the disclosure.

FIG. 2B illustrates an example block diagram 240 of a trailer. As shown, the system includes an ECU 242 of one or more computing devices, such as computing devices containing one or more processors 244, memory 246 and other components typically present in general purpose computing devices. The memory 246 stores information accessible by the one or more processors 244, including instructions 248 and data 250 that may be executed or otherwise used by the processor(s) 244. The descriptions of the processors, memory, instructions and data from FIG. 2A apply to these elements of FIG. 2B.

The ECU 242 is configured to receive information and control signals from the trailer unit, or from an articulating unit of a bus or other type of vehicle. The on-board processors 244 of the ECU 242 may communicate with various systems of the trailer or other articulating unit, including a deceleration system 252 (for controlling braking of the trailer), signaling system 254 (for controlling turn signals), and a positioning system 256 (to assist in determining the location of the trailer). The ECU 242 may also be operatively coupled to a perception system 258 with one or more sensors such as lidar, radar, cameras or any of the other sensors described above, for detecting objects in the trailer's (or articulating unit's) environment.

A power system 260 (for example, a battery power supply) provides power to local components on the trailer (or articulating unit). Some or all of the wheels/tires 262 of the trailer may be coupled to the deceleration system 252, and the processors 244 may be able to receive information about tire pressure, balance, orientation, wheel speed and other factors that may impact driving in an autonomous mode, and to relay that information to the processing system of the tractor unit. The deceleration system 252, signaling system 254, positioning system 256, perception system 258, power system 260 and wheels/tires 262 may operate in a manner such as described above with regard to FIG. 2A. The perception system 258 includes one or more sensor assemblies 264, that may be the same or similar to the sensor assemblies 232, in that they include one or more sensors at least partly received in a housing.

The trailer also includes a set of landing gear 266, as well as a coupling system 268. The landing gear provide a support structure for the trailer when decoupled from the tractor unit. The coupling system 268, which may be a part of coupling system 236 of FIG. 2A, provides connectivity between the trailer and the tractor unit. The coupling system 268 may include a connection section 270 (e.g., for power and/or pneumatic links) to provide backward compatibility with legacy trailer units that may or may not be capable of operating in an autonomous mode. The coupling system may also include a kingpin 272 configured for connectivity with the fifth-wheel of the tractor unit, although another type of mechanical coupling may be employed for other types of articulating units.

While the components and systems of FIGS. 2A-B are described in relation to a tractor-trailer arrangement, as noted above the technology may be employed with other types of articulated vehicles, such as the articulate bus 120 of FIGS. 1C-D. In addition, the technology described herein may also be implemented with other types of vehicles configured to operate in a fully or semi-autonomous mode of operation. This can include passenger-type vehicles, e.g., cars, motorcycles, recreational vehicles, etc.

Example Implementations

In view of the structures and configurations described above and illustrated in the figures, various implementations will now be described.

As noted above, aspects of the technology involve using a detailed kinematic model of the vehicle in conjunction with maps (e.g., roadgraphs) and other information to determine route feasibility. Determining the feasibility may include evaluating a hierarchical set of driving rules for the vehicle, and determining one or more of the rules can be broken or otherwise adjusted in a given driving situation. This can include re-prioritizing certain rules relative to one another, selecting which "rules of the road" to follow, etc. One aspect involves determining an ideal trajectory for the vehicle to take a particular driving action. Another aspect involves determining the route from a departure point to the destination.

A self-driving vehicle, such as a vehicle with level 4 or level 5 autonomy (see, e.g., FIGS. 1A-D, 2A-B) that can perform driving actions without human operation, has unique requirements and capabilities. For instance, a human truck driver may bend or break the rules of the road in order to make a turn, e.g., by driving over a double line or making a turn that takes up two lanes. In contrast, a self-driving truck may be configured to explicitly follow driving regulations, posted signage and other rules. However, in certain situations or conditions, rigid adherence to such rules may make it very challenging or even impossible to make a certain driving action by the autonomous vehicle, or potentially create a hazardous situation for the vehicle or other road users. Thus, aspects of the technology employ an intelligent approach that uses knowledge of the vehicle's kinematic model and other information to decide whether to deviate from a default driving approach. Such an intelligent approach can use heuristic and learned information, which can evaluate tradeoffs involving current conditions (e.g., traffic and weather conditions). The vehicle's control system may use this information in accordance with the vehicle model, for instance to actuate the driving system to perform specific maneuvers or have the planner module select an alternate route.

Information obtained from one or more sensors is employed so that the vehicle may operate in an autonomous mode. Each sensor, or type of sensor, may have a different range, resolution and/or field of view (FOV).

For instance, the sensors may include lidar with different ranges and/or FOVs. In one example, a long range lidar unit may have a range exceeding 25-250 meters to detect other road users such as on a freeway, while a short range lidar unit may have a range no greater than 1-25 meters as part of a close sensing system adjacent to the vehicle. Alternatively, the short range lidar may generally cover up to 3-10 meters from the vehicle while the long range lidar may cover a range exceeding 100 meters. In another example, the long range is between 10-200 meters, while the short range has a range of 0-20 meters. In a further example, the long range exceeds 80 meters while the short range is below 50 meters. Intermediate ranges of between, e.g., 10-100 meters can be covered by one or both of the long range and short range lidars, or by a medium range lidar that may also be included in the sensor system. In one scenario, a medium range lidar may be disposed between the long and short range lidars in a single housing. In addition to or in place of these lidars, a set of cameras may be arranged, for instance to provide forward, side and rear-facing imagery. Alternatively or additionally, a set of radar sensors may also be arranged to provide forward, side and rear-facing data. Other sensors may include an inertial sensor such as a gyroscope, an accelerometer, etc. Sensors of different types may be co-located in one sensor assembly, and different sensor assemblies may be arranged at different locations on the vehicle to provide a comprehensive view of the vehicle's environment.

Figure 3A:
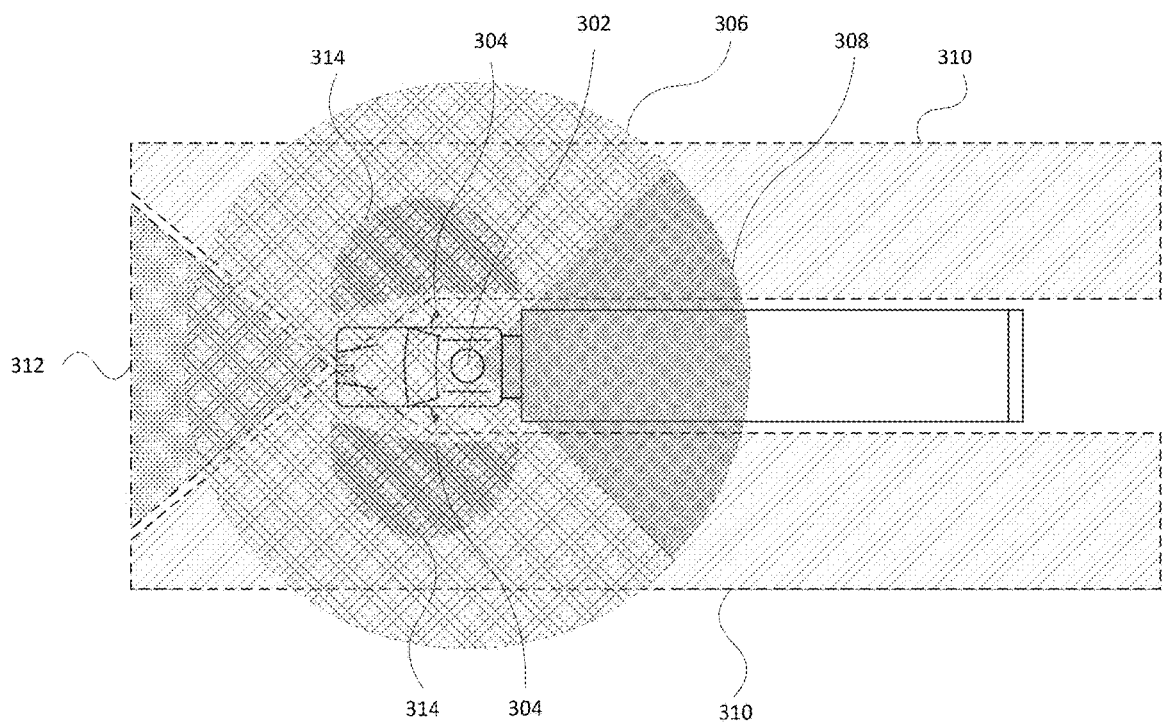
FIG. 3A is an example of sensor coverage for a vehicle in accordance with aspects of the disclosure.
Figure 3B:
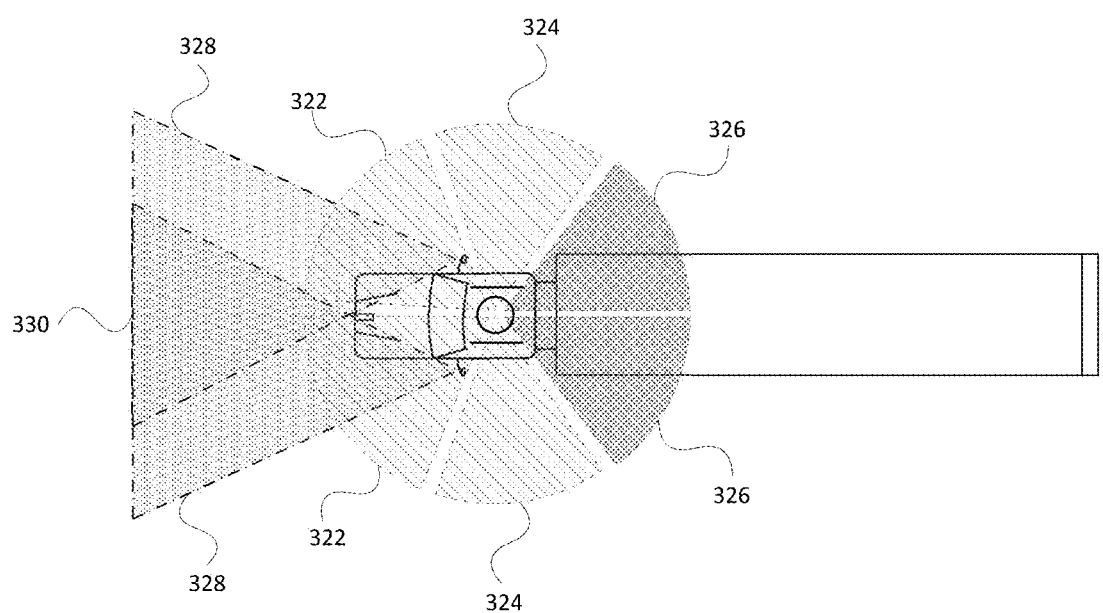
FIG. 3B is another example of sensor coverage for a vehicle in accordance with aspects of the disclosure.

Examples of lidar, camera and radar sensors and their fields of view are shown in FIGS. 3A and 3B. In example 300 of FIG. 3A, one or more lidar units may be located in rooftop sensor housing 302, with other lidar units in side sensor housings 304. In particular, the rooftop sensor housing 302 may be configured to provide a 360° FOV. A pair of sensor housings 304 may be located on either side of the tractor unit cab, for instance integrated into a side view mirror assembly, along a side door or quarterpanel of the cab, or extending out laterally along one or both sides of the cab roof. In one scenario, long range lidars may be located along a top or upper area of the sensor housings 302 and 304. The long range lidar may be configured to see over the hood of the vehicle. And short range lidars may be located in other portions of the sensor housings 302 and 304. The short range lidars may be used by the perception system to determine whether an object such as another vehicle, pedestrian, bicyclist, curb or other obstacle, etc. is next to the front or side of the vehicle and take that information into account when determining how to drive or turn. Both types of lidars may be co-located in the housing, for instance aligned along a common vertical axis.

As illustrated in FIG. 3A, the lidar(s) in the rooftop sensor housing 302 may have a FOV 306. Here, as shown by region 308, the trailer or other articulating portion of the vehicle may provide signal returns, and may partially or fully block a rearward view. Long range lidars on the left and right sides of the tractor unit have fields of view 310. These can encompass significant areas along the sides and front of the vehicle. As shown, there may be an overlap region 312 of their fields of view in front of the vehicle. The overlap region 312 provides the perception system with additional or information about a very important region that is directly in front of the tractor unit, for instance by providing more detailed point cloud information. This redundancy also has a safety aspect. Should one of the long range lidar sensors suffer degradation in performance, the redundancy would still allow for operation in an autonomous mode. Short range lidars on the left and right sides may have different (e.g., smaller) fields of view 314, for instance to detect objects immediately adjacent to the side of the tractor. A space is shown between different fields of view for clarity in the drawing; however in actuality there may be no break in the coverage. The specific placements of the sensor assemblies and fields of view is merely exemplary, and may be different depending on, e.g., the type of vehicle, the size of the vehicle, FOV requirements, etc.

FIG. 3B illustrates an example configuration 320 for either (or both) of radar and camera sensors in a rooftop housing and on both sides of a tractor-trailer vehicle. Here, there may be multiple radar and/or camera sensors in each of the sensor housings 302 and 304. As shown, there may be sensors in the rooftop housing with front fields of view 322, side fields of view 324 and rear fields of view 326. As with region 308, the trailer may impact the ability of the sensor to detect objects behind the vehicle. Sensors in the sensor housings 304 may have forward facing fields of view 328 (and side and/or rear fields of view as well). As with the lidars discussed above with respect to FIG. 3A, the sensors of FIG. 3B may be arranged so that the adjoining fields of view overlap, such as shown by overlapping region 330. The overlap regions here similarly can provide redundancy and enhanced resolution, and have the same benefits should one sensor suffer degradation in performance.

These sensors are employed to gather information about the external environment around the vehicle, including other objects, road conditions, weather conditions, etc. Sensor information can also be used to obtain pose and other information about the vehicle itself, such as an accurate trailer position relative to the tractor. The on-board control system is able to use the received sensor information and the vehicle's kinematic model in conjunction with geographic data (e.g., maps) to plan routes or select trajectories that are optimized for vehicle maneuvering.

Figure 4A:
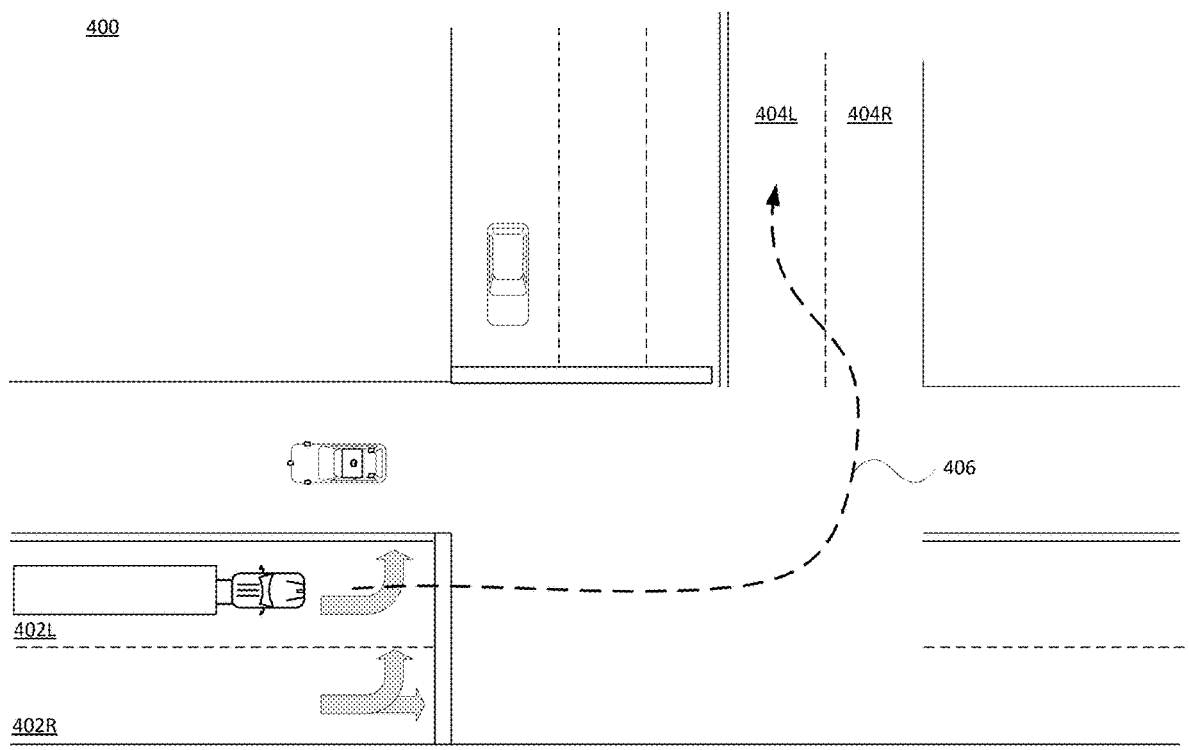
Figure 4B:
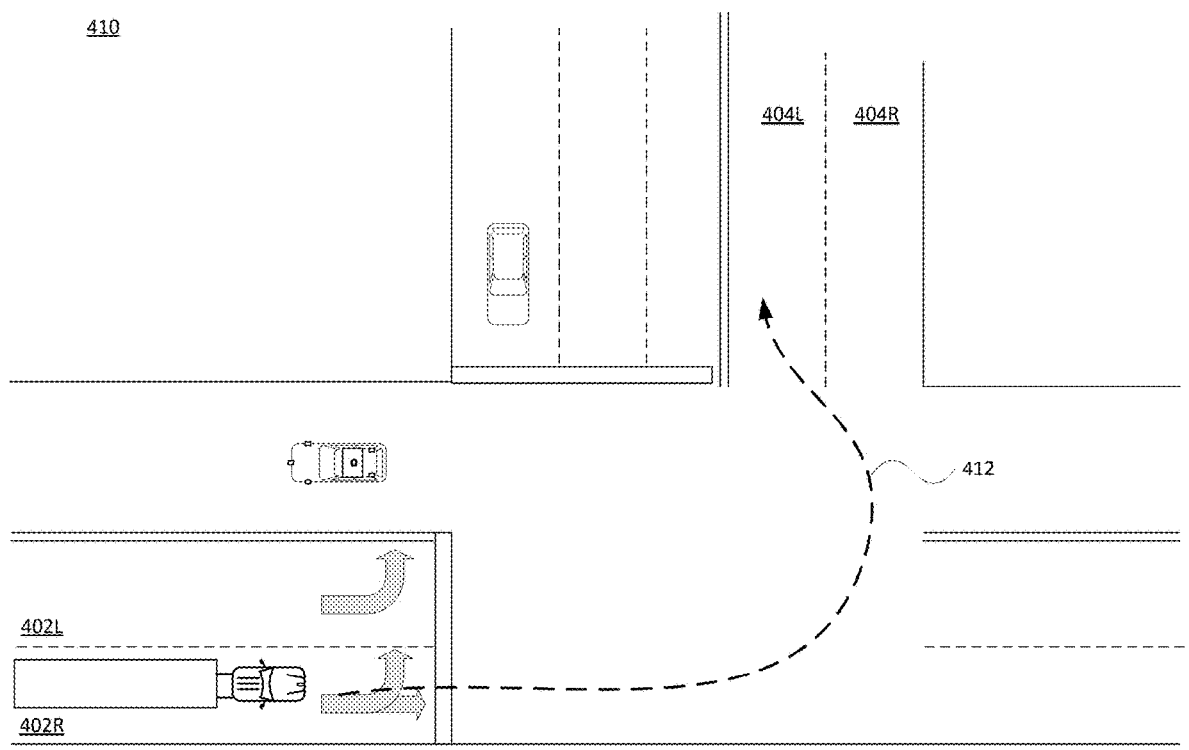

With regard to real-time autonomous driving, the vehicle's control system is able to determine the kinematic feasibility of whether the vehicle can make a particular turn or take another driving action (e.g., going under a bridge or driving down a residential street). This is done based on the swept volume of the vehicle (e.g., tractor+trailer(s), cab+articulating unit of a bus, etc.) in view of the planned trajectory. FIGS. 4A and 4B illustrate two alternatives for a truck making a left hand turn. As shown in view 400 of FIG. 4A, if the truck is making the left turn from left lane 402L, based on the size of the truck, lane configuration and other factors, the truck may need to at least partly enter right lane 404R before pulling into the left lane 404L. This may involve crossing a dashed lane line between the lanes 404, as shown by dashed line 406. In contrast, as shown in view 410 of FIG. 4B, if the truck is in right lane 402R, it may be able to maneuver so that it turns into lane 404L without first entering lane 404R or otherwise avoid crossing the dashed lane line between the lanes 404, as indicated by dashed line 412. In another example, two or more smaller trailers may make a particular driving action (e.g., a tight turn) more feasible than one large trailer. Here, as shown in view 420 of FIG. 4C, the truck may be able to make an even tighter turn into lane 404L as shown by dashed line 422.

The onboard system may evaluate driving options by forward simulating the geometry of the vehicle (e.g., tractor+trailer) based on a detailed kinematic model to determine whether the vehicle would collide with objects, drive over lane lines, pass too close to other road users, etc. This evaluation can also be extended to incorporate routing and/or map information. While the map information may be image-based (e.g., raster images), it may alternatively or additionally include one or more roadgraphs or graph networks of information such as roads, lanes, intersections, and the connections between these features. Each feature may be stored in memory as graph data. The features may be associated with information such as a geographic location and whether or not they are linked to other related features. For example, a stop sign or traffic light may be linked to a road and an intersection, etc. In some examples, the associated data may include grid-based indices of a roadgraph to allow for efficient lookup of certain roadgraph features.

The kinematic model can be evaluated based on observed or estimated occlusions in the perception system's FOV to precompute scores for turn-ability. These processes can be done in real time for current and upcoming driving actions on the planned route. For instance, based on prior experience (e.g., prior driving at the same intersection by the vehicle or another road user), the system can identify consistent or persistent occlusions (as opposed to temporary occlusions from passing vehicles, etc.), and factor them in when relevant.

Figure 5B:
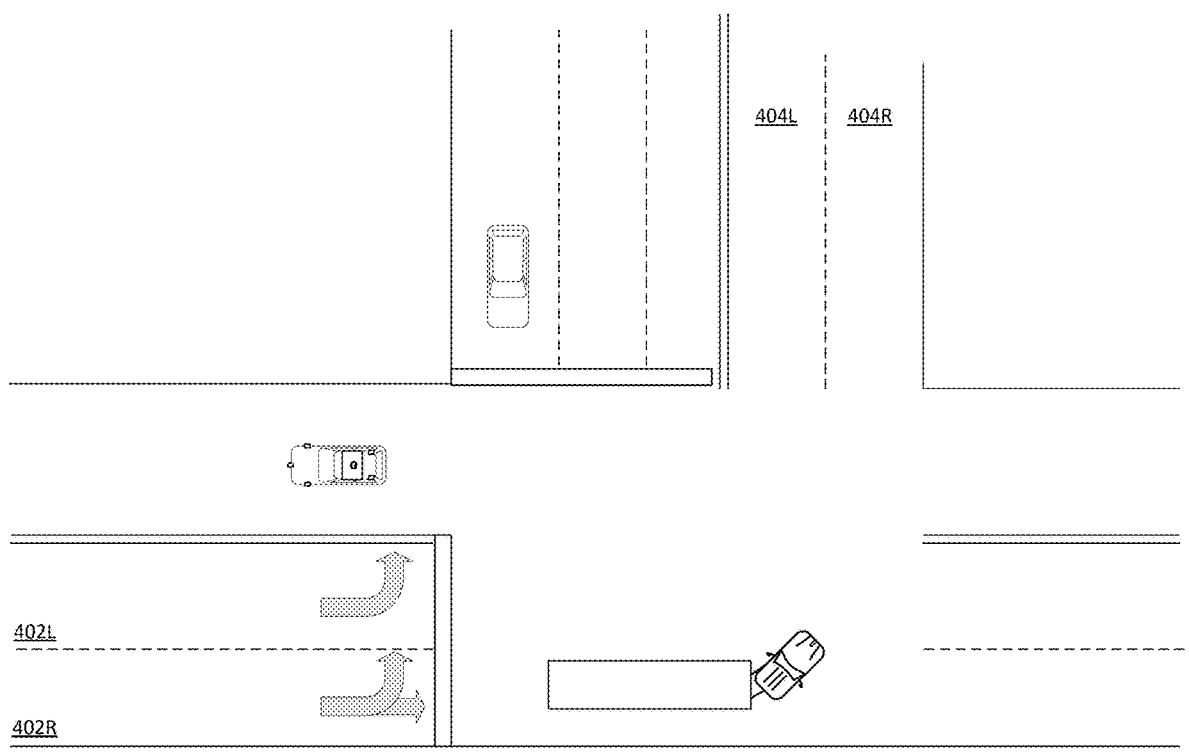
Figure 5C:
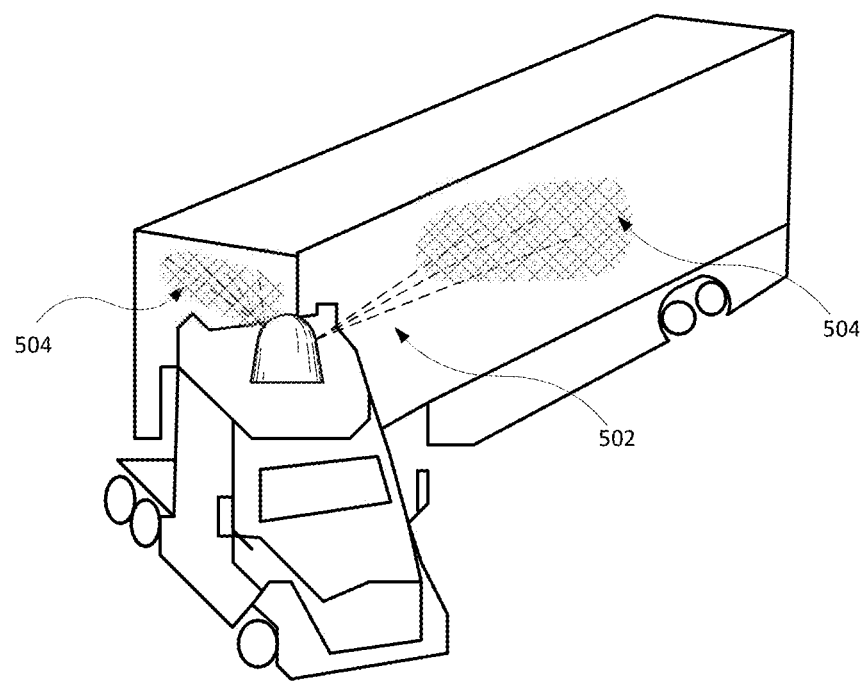

FIGS. 5A and 5B illustrate examples of the truck of FIGS. 4A and 4B turning into lane 404L, respectively. Because the truck in lane 402R can take a less sharp turn than the truck in lane 402L, there may be less self-occlusion from the trailer. For instance, as shown in FIG. 5C, shorter dashed lines 502 illustrate emitted beams from a lidar sensor (or radio waves from a radar sensor) that are blocked by a portion of the vehicle (e.g., a front or side surface of the trailer), as shown by regions 504. The planner module may arrange a route segment so that the vehicle is in the right lane as opposed to the left lane in order to minimize such self-occlusions.

In addition, offline evaluations can be performed ahead of time by the vehicle or a backend system based on various constraints (costs), for instance to block off areas as places where the vehicle is either not able to drive (e.g., no right turns) or may be limited to a subset of driving actions (e.g., left turns only from the rightmost lane). As part of determining the overall route, the approaches noted above for discrete driving actions can be applied to the general routing problem of getting from the starting point to the destination, whether or not a portion of the map has been blocked off as undrivable or otherwise constrained.

The system may also take into consideration other costs. For instance, one cost may be the time of day. Here, it may be permissible to make a double left turn late at night, but not during rush hour. Another cost may be crossing a lane line. This may involve crossing over a lane line between adjacent lanes going in the same direction, or crossing over into an oncoming lane. Here, the former may be permissible at any time, while the latter may be permissible in non-rush hour situations.

A further cost can involve whether to drive over a curb or other road feature. (depends on curb height, e.g., from the roadgraph and/or perception system detection). FIGS. 6A-F illustrate cross-sectional views of various examples 600, 610, 620, 630, 640 and 650 of different curb configurations. For instance, in example 600, the roadway 602 abuts a vertical curb 604, which is next to a shoulder such as grassy area 606. Here, the vertical curb 604 may exceed a threshold height, such as 3-6 inches or more. In this case, the cost associated with the curb height may be such that the vehicle must not drive over it. Similarly, in example 610, the roadway 612 abuts an extruded bituminous curb 614 or other berm, which is next to grassy area 616. Here, depending on the height of the curb 614 relative to the roadway 612 and/or the grassy area 616, the system may determine whether the curb 614 can be driven over.

In contrast, in example 620 the roadway 622 abuts a curb 624 that has a height lower than the threshold height (e.g., no more than 3 inches). Here, given that the curb height is lower than the threshold and the grassy area 626 adjacent to the curb also satisfies a threshold criteria (e.g., low grade, generally aligned with the curb), the system may determine that the vehicle is able to drive over the curb if necessary to perform a particular driving maneuver (e.g., making a left or right turn). As shown in example 630, the roadway 632 and curb 634 may be generally planar. The grassy area 636 may also be aligned with the curb 634. Here, the system may mark the roadgraph or otherwise determine that the curb 634 may be driven over in any situation without constraint.

Figure 6A:
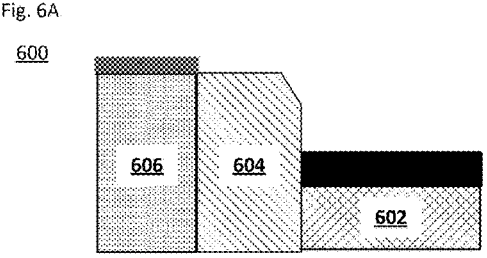
FIGS. 6A-F illustrate curb configurations in accordance with aspects of the disclosure.
Figure 6B:
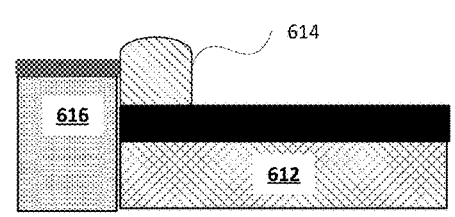
Figure 6C:
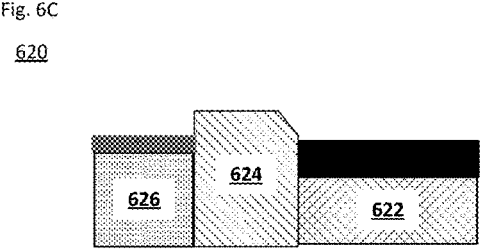
Figure 6D:
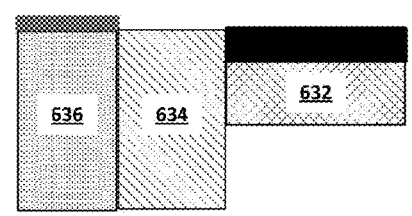
Figure 6E:
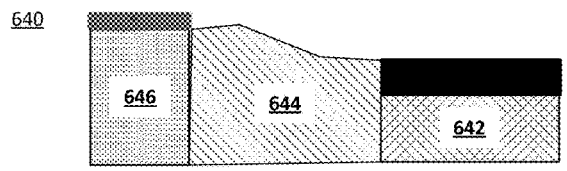
Figure 6F:

And FIGS. 6E and 6F illustrate two other curb arrangements in which the cost of driving over the curb can be evaluated prior to and/or during driving along a section of roadway. As shown in example 640, at least part of the curb 644 is generally aligned with the roadway 642. The grassy area 646 may be aligned with another part of the curb, for instance elevated above the roadway as shown. In contrast, as shown in example 650, while part of the curb 654 is generally aligned with the roadway 652 and another part of the curb is generally aligned with the grassy area 656, here the roadway 652 is elevated above the grassy area 656. In these examples, the system may determine that the vehicle can drive over a portion or all of the curb. The relative elevations of the roadway and grassy areas and/or the pitch of the curb may be taken into account when determining how much of the curb can be driven over. As noted above, the roadgraph of this section of the route may include information about curb height, pitch, etc. This information can be evaluated in view of the kinematic model of the vehicle, cargo weight and placement, as well as other factors (e.g., whether other vehicles been observed riding over the curb).

Figure 7:
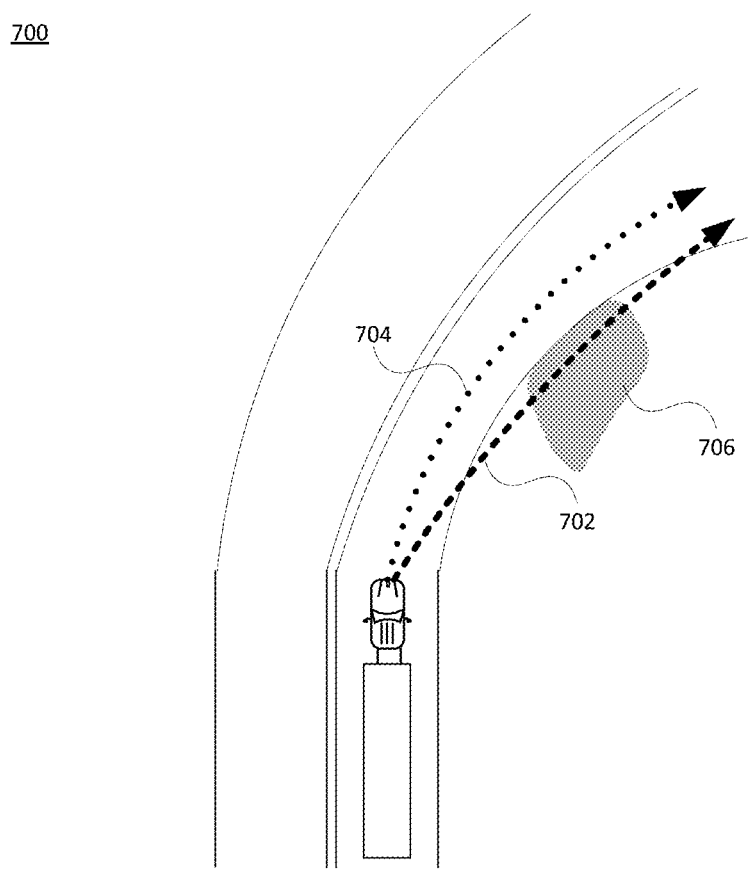
FIG. 7 illustrates a road edge configuration in accordance with aspects of the disclosure.

Similar to the curb configuration, another cost constraint to consider during route planning and making driving decisions is whether the road edge is a hard or soft surface. FIG. 7 illustrates an example 700 of a curved roadway. By way of example, based on the kinematic model of the vehicle, it may be determined by the onboard or offboard system that the vehicle has two path options, to drive along the edge or side of the road as shown by dashed line 702, or to drive along the center of the lane as shown by dotted line 704. The system may choose the path along the center of the lane, e.g., when the side of the road has a grass or dirt surface or is sharply pitched, even though this may be a more difficult path when the road has a tight curve. In contrast, the system may choose the path along the side of the road, e.g., when the shoulder area 706 adjacent to the road is gravel or paved and is generally level with the roadway surface.

Yet another cost is neighborhood type, such as whether the vehicle will be traveling in a residential area or industrial area. This can include factoring in any relevant zoning requirements that may restrict vehicle weight or size, road size/configuration, etc.

Any of these costs may be relevant to discrete real-time driving decisions in addition to routes that are planned ahead of time. While a few specific examples have been explained above, generally the costs that may be evaluated include, but are not limited to fuel consumption, the number of turns required (e.g., for a particular maneuver or for a route segment), zoning requirements, and whether the vehicle may need to reverse, timing such as the expected arrival time or total trip time. Other costs can include how difficult it will be to re-route the vehicle if a turn, exit ramp or lane change is missed, whether certain maneuvers may be constrained due to occlusions or other visibility limitations, as well as whether different maneuvers can be performed (or are not permitted) based on sensor placement along the vehicle. Still further costs include weather factors (for example if they affect sensor visibility), as well as detecting low overhangs (e.g., bridge or overpass height requirements) or vegetation (e.g., trees with branches extending above the roadway). In addition, there may be costs pertaining to restrictions associated with a route segment or overall route, such as time-dependent restrictions, weight or size restrictions, safety restrictions (e.g., no hazardous materials permitted), etc. Historical models of either traversal time between points of interest or other nodes, or maneuver difficulty for various vehicle types or configurations, can also have associated costs. For instance, a given turn may be easier for a minivan, more difficult for a tractor, and infeasible for a tractor-trailer. Yet another cost may be associated with weigh stations, including whether or not the vehicle is permitted to avoid an open weigh station. These route constraints may be coded or overlaid onto the map, such as a roadgraph.

The route evaluation can include a gradation of maneuver costs, for instance with certain types of turns getting higher or lower scores. By way of example, this can include evaluating turning without departing the lane at all, turning with a slight lane departure (e.g., less than 0.5-1.0 meters), and turning with a major lane departure (e.g., 2-3 meters or more). This evaluation may include a swept volume analysis for the vehicle (e.g., tractor and trailer(s)) as discussed below. If a maneuver involves the trailer overlapping with the curb or area adjacent to the roadway, this could also lower the score. Different road types may have different costs associated with them. For instance, driving through a parking lot with a truck can have a higher cost than driving the truck on a freeway or major boulevard. Maneuver costs, or an estimated likelihood of success of a given maneuver, may vary depending on factors such as traffic conditions, time of day, weather, etc. The degree of difficulty of a given maneuver may be another factor in the computed cost. In addition, different costs may be associated with different types of lane departure. Thus, a first cost can be assigned for departing the lane into another lane in the same direction of travel, a second cost for crossing over into an oncoming lane, a third cost for entering into a bike lane, a fourth cost for driving on the shoulder, etc. The cost associated with each lane type can vary, for instance depending on the factors listed above.

More particularly, using the kinematic model and other information, the system can predict the swept volume of the vehicle for a given maneuver. This is used to determine how best to perform a particular driving operation (e.g., make a left turn when there are multiple turn maneuvers that may be needed) or to determine if a particular route is kinematically feasible. For instance, the route may be overlaid on a map along with swept volume. The onboard planner or offboard system may compute other agents and obstacles for different possible routes on the map. A set of curves can then be determined for possible paths, and perform a geometry calculation for the swept volume to determine potential overlaps with other objects. As noted above, there may be regions on the map where the vehicle cannot travel due to legal restrictions (e.g., weight class or time of day) or physical restrictions (e.g., road width, low overhanging tree branches). The system can then precompute scores for each path, and select an appropriate route.

For a tractor-trailer (or other articulated vehicle), there are different approaches that can be employed to include trailer (s) in the trajectory evaluation for the kinematic model of the vehicle. In particular, one approach is to construct a separate trajectory evaluation for the tractor and each trailer ("link"), perform a full evaluation for all links during the projected driving operation, and then merge the results of all the evaluations. Another approach is to construct a separate set of segments for each link in the trajectory, iterate over these in for different parts of the driving operation, and merge the results. Yet another approach is to take advantage of similarities between tractor and trailer motions. A polygon primitive can be employed that computes a polygon's (e.g., other road user's) position relation to a vehicle trajectory. In particular, the polygon primitive can be used to determine all intervals along the trajectory where the vehicle will overlap the polygon, which would indicate areas where the maneuver would fail. Additionally, the polygon primitive can be used to compute all the local minima of a lateral distance between the vehicle and the polygon, including where and on which side or the trajectory they lie. This process can be greatly accelerated, particularly when querying proximities for multiple polygons, by precomputing a trajectory. This precomputation may take the form of a sequence of segments which represent intervals in the trajectory where the motion of a link (tractor or trailer) can be accurately approximated by straight lines. Additionally, adjacent segments can include a precomputation about how they are connected to enable more accurate overlaps. In one scenario, each link may have its own sequence of segments. This leverages the fact that a trailer follows the same class of path as a vehicle with steerable front axle at the tow point.

Figure 8A:
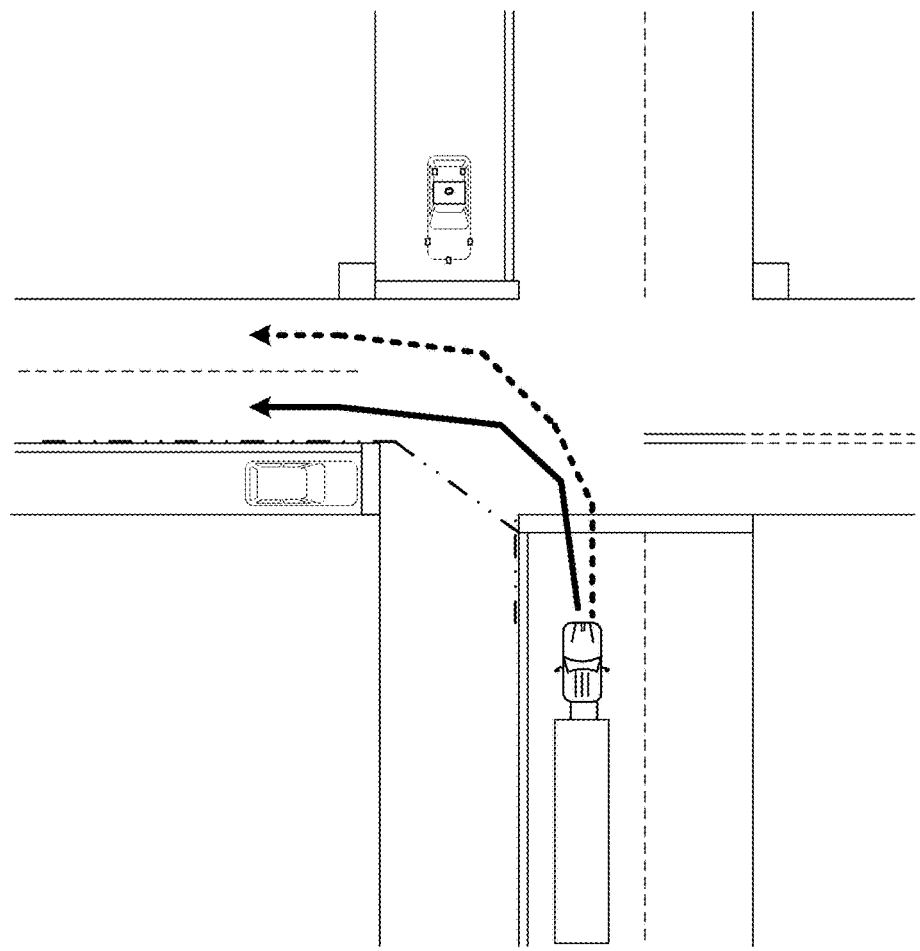
FIGS. 8A-C illustrate turning options in accordance with aspects of the disclosure.

One often-encountered trajectory situation that can be addressed by this kinematic model approach is making a turn. If the turn is tight or it is difficult to stay within a driving lane, the vehicle could make a double turn or swing out wide and cut back in. In this case, such maneuvers may involve driving over a dashed white lane line, e.g., into an adjacent lane traveling in the same direction. FIG. 8A illustrates an example 800 of a left turn scenario with different possible paths. In this example, the dash-dot line indicates a legal limit for the vehicle's turning path, such as to not cross over into a lane of opposing traffic. The path with the solid line turning into the left lane, similar to the example of FIG. 4A, may be kinematically unfeasible because the turn is too tight for the vehicle. In contrast, the path with the dashed line turning into the right lane may be the only kinematically feasible option.

Other maneuvers may involve driving over a double yellow line, e.g., crossing over the dash-dot line of FIG. 8A into an opposing lane of traffic. While this could encroach on the legal limit for a turn, it may be the only viable option that allows the vehicle to make the turn, for instance if the right lane is blocked due to a double-parked vehicle.

Figure 8B:
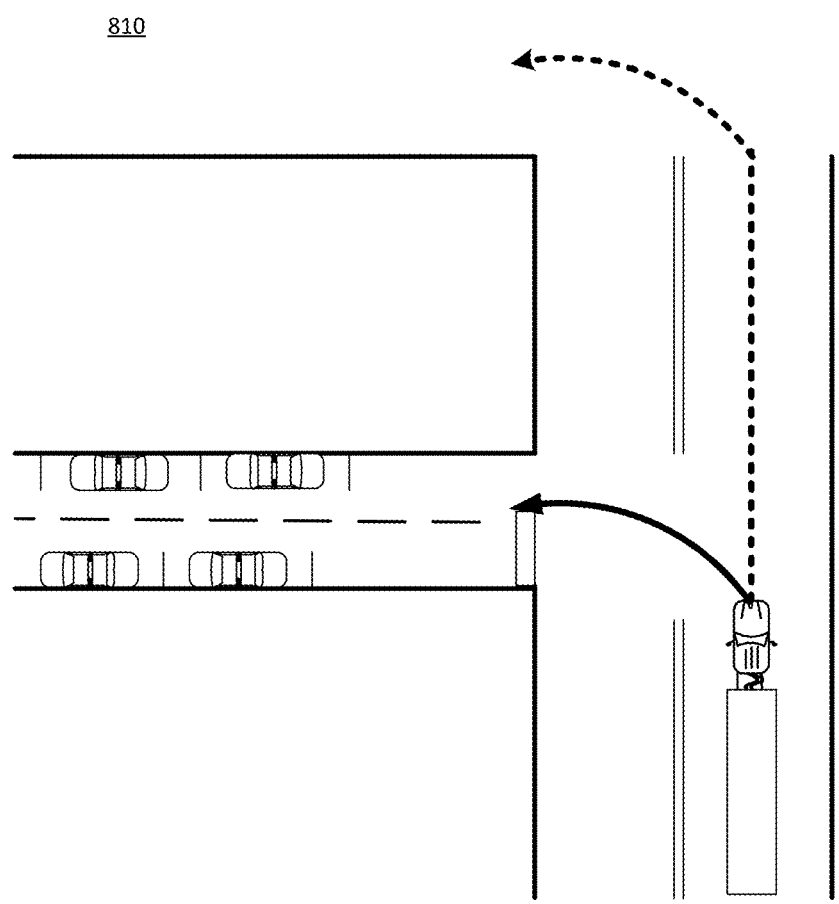

FIG. 8B illustrates a different scenario 810, where the vehicle needs to make a left turn, and has the option of turning down two or more streets. In this scenario, as shown by the path with the solid line, the first side street may be too narrow (e.g., due to street width, parked cars, etc.) for a kinematically feasible turn. Thus, as shown by the path with the dashed line, the vehicle may elect to turn down the next side street that does not have the kinematic constraint of the first side street. Here, information about street width may be associated with the roadgraph, while information about parked cars and other temporary obstructions may be detected by the vehicle's sensors.

Figure 8C:
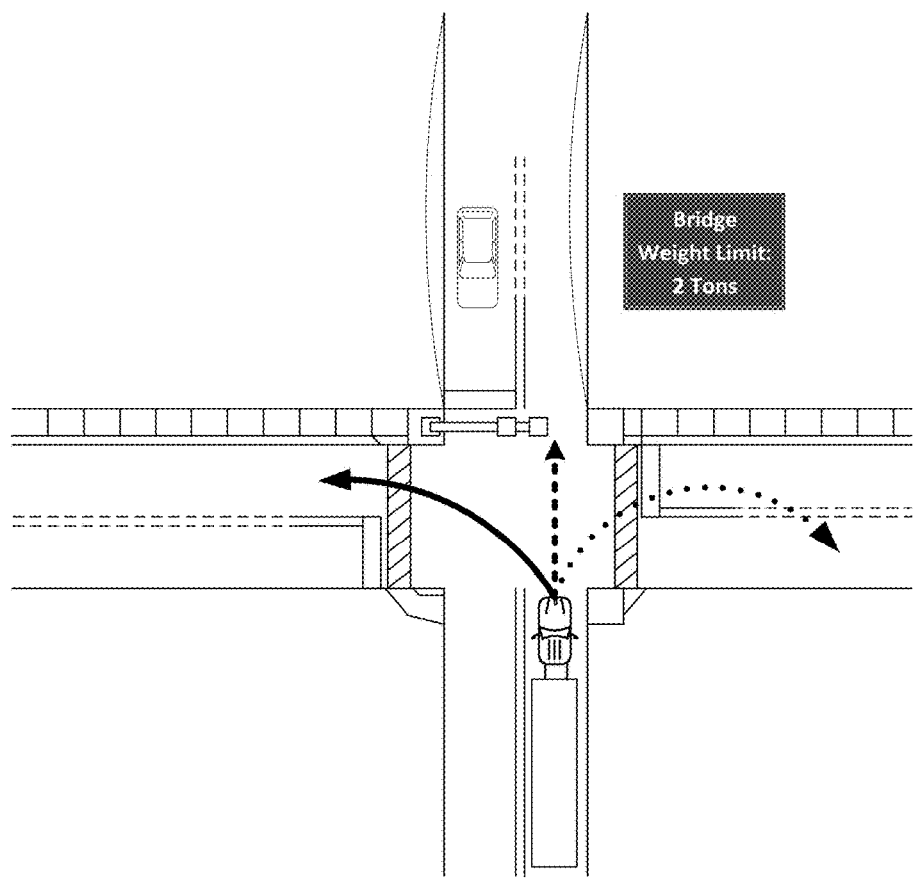

FIG. 8C illustrates yet another scenario 820. Here, the intersection may appear to provide different options for the vehicle, e.g., go straight, right or left. However, road constraints or kinematic limitations may require elimination of certain route options. As shown by the path with the dotted line, it may be kinematically challenging to make a right turn without crossing over into an oncoming lane. As shown by the path with the dotted line, the vehicle may not be permitted to go straight due to a weight limit on the bridge. Thus, as shown by the path with the solid line, the only feasible option may be for the vehicle to make the left turn.

In one scenario, the hierarchical set of rules may indicate, e.g., (i) that the vehicle can drive over the dashed white line between lanes in the same direction of travel any time a turn is being made, so long as there is no vehicle in the adjacent lane within a threshold lateral distance adjacent to the vehicle (e.g., 2-3 meters). It may also indicate (ii) that the vehicle can drive over a double yellow line only when there is no opposing traffic within a threshold distance from the front of the truck (e.g., 50-76 meters). The hierarchy may further indicate (iii) that the vehicle can drive over a portion of the curb, but only when there is no other vehicle or other object within a certain distance (e.g., 4-5 meters) from the projected swept volume of the vehicle and the curb is determined (e.g., via the roadgraph and/or sensor data) to be no more than 10 cm high or satisfy other conditions such as those discussed above with regard to FIGS. 6A-E. Here, the analysis may evaluate, among other factors, the weight of the vehicle, the distribution of cargo, etc., to ensure that driving over the curb would not pose a safety issue. By way of example, the onboard planning system or back end system may seek to find the kinematically optimal path. However, in this scenario, the hierarchy may specify that the system must first determine whether (i) provides a viable turning option before trying (ii), and similarly, evaluating (ii) before analyzing (iii). Thus, it can be seen that evaluating the hierarchical set of rules may include evaluating driving operations associated with lane indicators, physical parts of the roadway (e.g., curbs), as well as other factors. Additionally or alternatively, the evaluation may include re-prioritizing different rules.

As noted above, one type of cost constraint may involve temporal restrictions. Here, the system is able to weigh the cost of certain maneuvers based on the time of day (and other factors). For instance, there may be certain actions the vehicle could take with less traffic at an intersection, such as during non-rush hour times. So if the vehicle were traveling overnight, a major lane departure (e.g., crossing over a double yellow line) to make a turn may be weighted differently than if the same turn were to be made during rush hour at a busy intersection. For instance, the cost associated with a non-peak maneuver may be less than the cost associated with a maneuver performed during a peak time depending on vehicle size or type. Thus, the cost for a peak maneuver for a tractor-trailer may be higher than the cost for the same peak maneuver for a sedan. Furthermore, the system may factor in whether a particular maneuver can be completed, or a given route segment traversed in a certain timeframe, for instance before a time-based restriction is enacted. For instance, if there is no left turn restriction from 7 am-9 am, will the vehicle arrive at the intersection and be able to make the turn by 6:59 am? If not, an alternate route needs to be planned Another aspect of maneuver selection for real-time driving involves social niceties on the road. This includes providing other road users advanced warning of turns or lane changes. For instance, the planner module may pre-plan strategies for when to change lanes in advance of a particular turn, prior to exiting a freeway, etc. Thus, if the exit is coming up in one mile or the current lane is ending or merging with another lane in the next 1500 feet, the system needs to select when to change lanes or decelerate prior to reaching the exit ramp. This can include making a decision on when to activate different indicators on the vehicle to let other road users know about maneuver.

A further issue that is relevant to route planning and maneuver selection is the potential for the vehicle becoming stuck. Predicting the likelihood of a stuck situation can be used to select (or not select) a given maneuver or a route. It may also impact other driving decisions. This can include going more slowly so as not to miss a turn, since the next turn off may not be for several miles. It can also involve forced lane changes in a more assertive manner than usual, for instance initiating the lane change with less following distance to the vehicle in front (e.g., 10% less) than usual, to ensure the vehicle is able to exit the freeway or to ensure proper merging in a safe manner. Other routing decisions to avoid stuck situations include moving out of a freeway exit lane early to avoid not being able to change lanes later, evaluating the "narrowness" of lanes, with a preference for "wider" lanes, avoiding one-way roads, and identifying the availability of u-turn spots along the planned route. However, when driving the vehicle may become stuck notwithstanding the selected driving decisions. At this point, the vehicle may pull over and contact remote assistance. This can involve a remote user taking over partial or full driving control in order to perform a maneuver that the vehicle on its own is not able to take (e.g., backing up a narrow street).

Figure 9A:
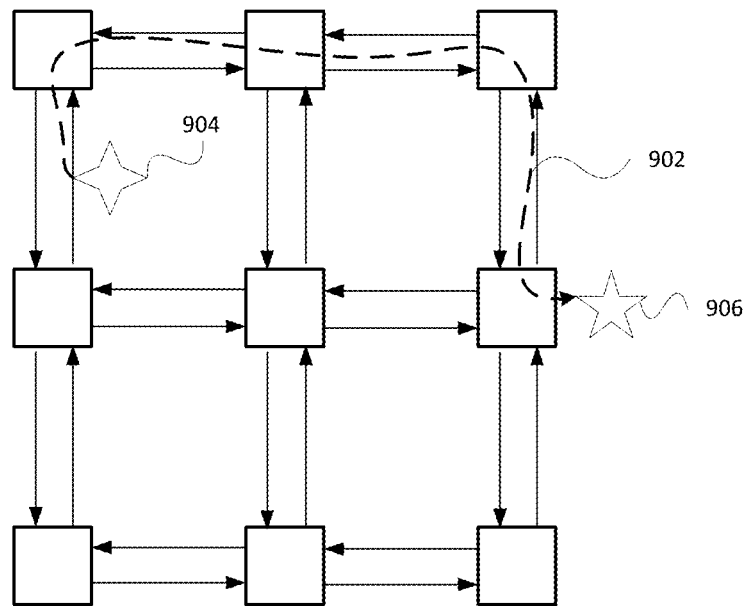
FIGS. 9A-D illustrate example route planning scenarios in accordance with aspects of the disclosure.

Examples of overall route planning are shown in FIGS. 9A-D. FIG. 9A illustrates a first example 900 in which the routing system determines an optimal route 902 from a starting location 904 to a destination 906. The square nodes indicate different points between the starting location and the destination, and the arrows between the points indicate possible route segments. As shown in example 910 of FIG. 9B, each possible route segment has a cost value associated with it. Path 912 is shown based on determination that minimizes the cost of the route. Certain segments, such as dotted arrow 914, may be restricted to the vehicle (e.g., due to a truck weight or size limit). In this example, the cost associated with that segment may be set arbitrarily high or otherwise indicated that that particular segment is not usable.

Figure 9B:
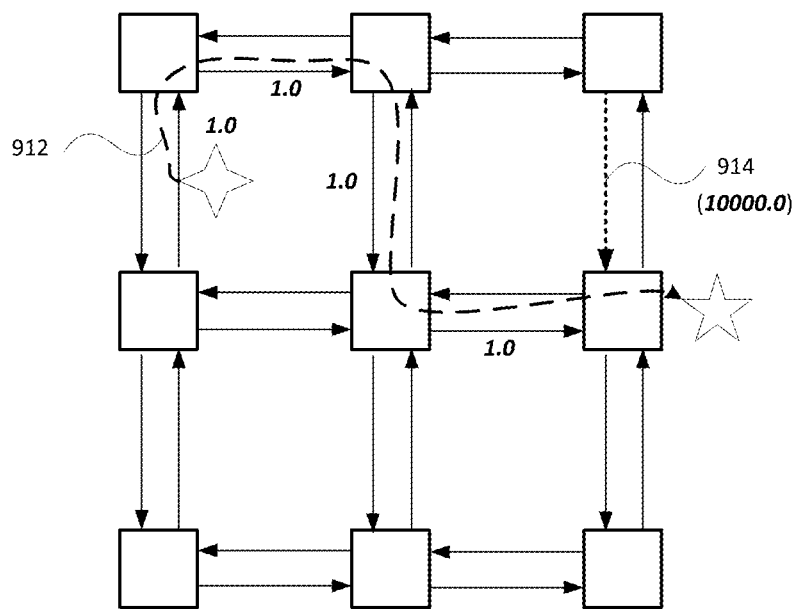
Figure 9C:
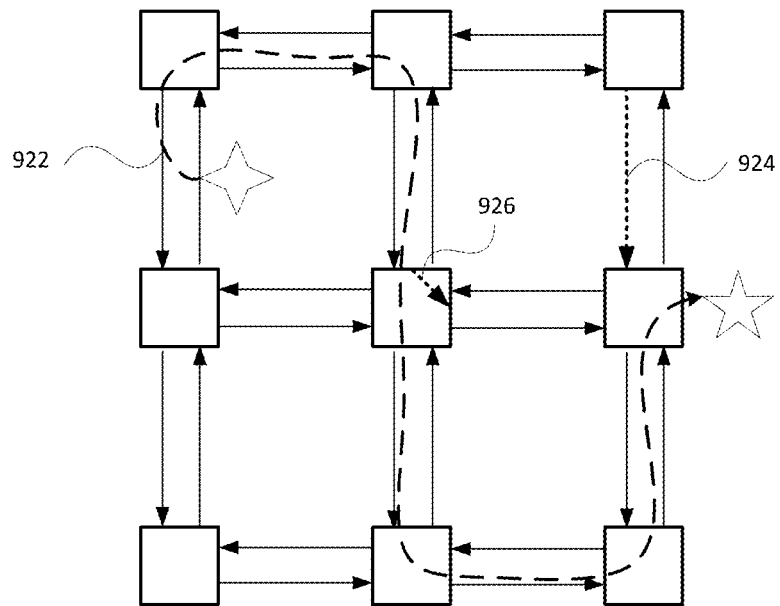

FIG. 9C illustrates an example 920 in which the path 922 factors in not only unusable route segments such as segment 924, but also segments that may be kinematically difficult or infeasible for the vehicle (e.g., a tight turn onto a narrow street during rush hour), such as segment 926. As shown, the path 922 in this example avoids both the unusable segment and the kinematically challenging segment, and thus does not pass through any restricted part of the map (e.g., roadgraph).

Figure 9D:
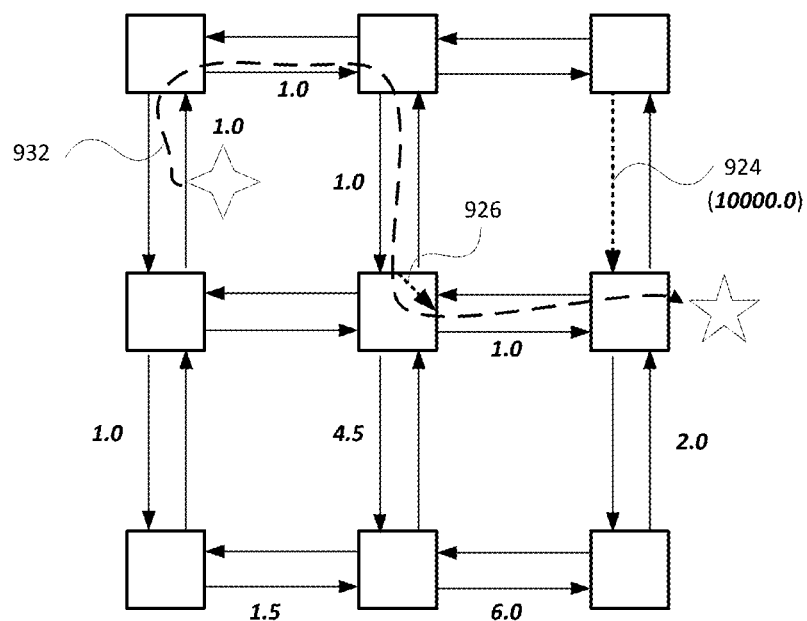

In the example 930 of FIG. 9D, the planning system factors in costs and kinematic feasibility to select a path 932. Here, segment 924 is avoided because it is restricted to the vehicle. In contrast, segment 926 may be kinematically challenging, but permissible. However, other route segments may have higher costs associated with them, for instance due to added distance, extra time, etc. Thus, in this case the system may select segment 926 even though it involves a kinematically challenging driving maneuver.

Information about restrictions and costs may be obtained from other vehicles that have driven along the route segments. This can include information about actions taken (or attempted) by a truck, bus or other vehicle, or what the other vehicle observed along its route. This information may be shared with other vehicles in the fleet and/or with a back end system that will aggregate the information from different vehicles in order to create default routes.

Figure 10A:
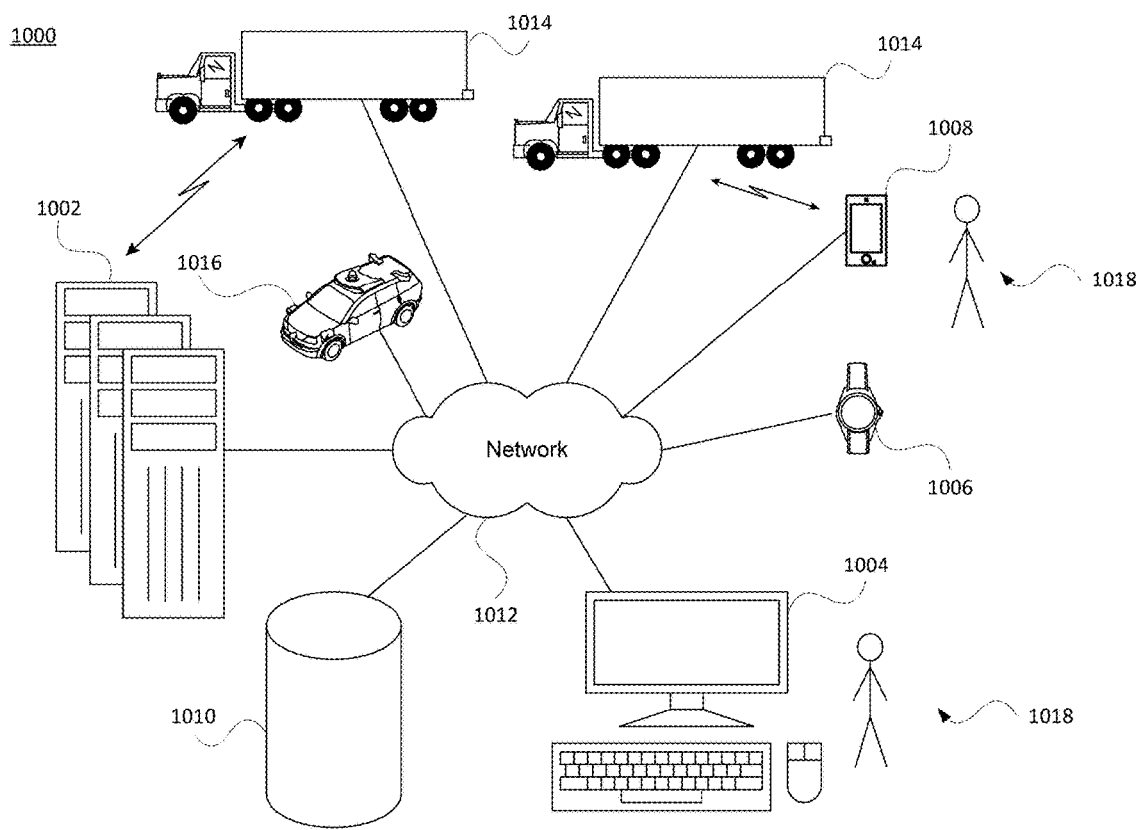
FIGS. 10A-B illustrate an example system in accordance with aspects of the disclosure.
Figure 10B:
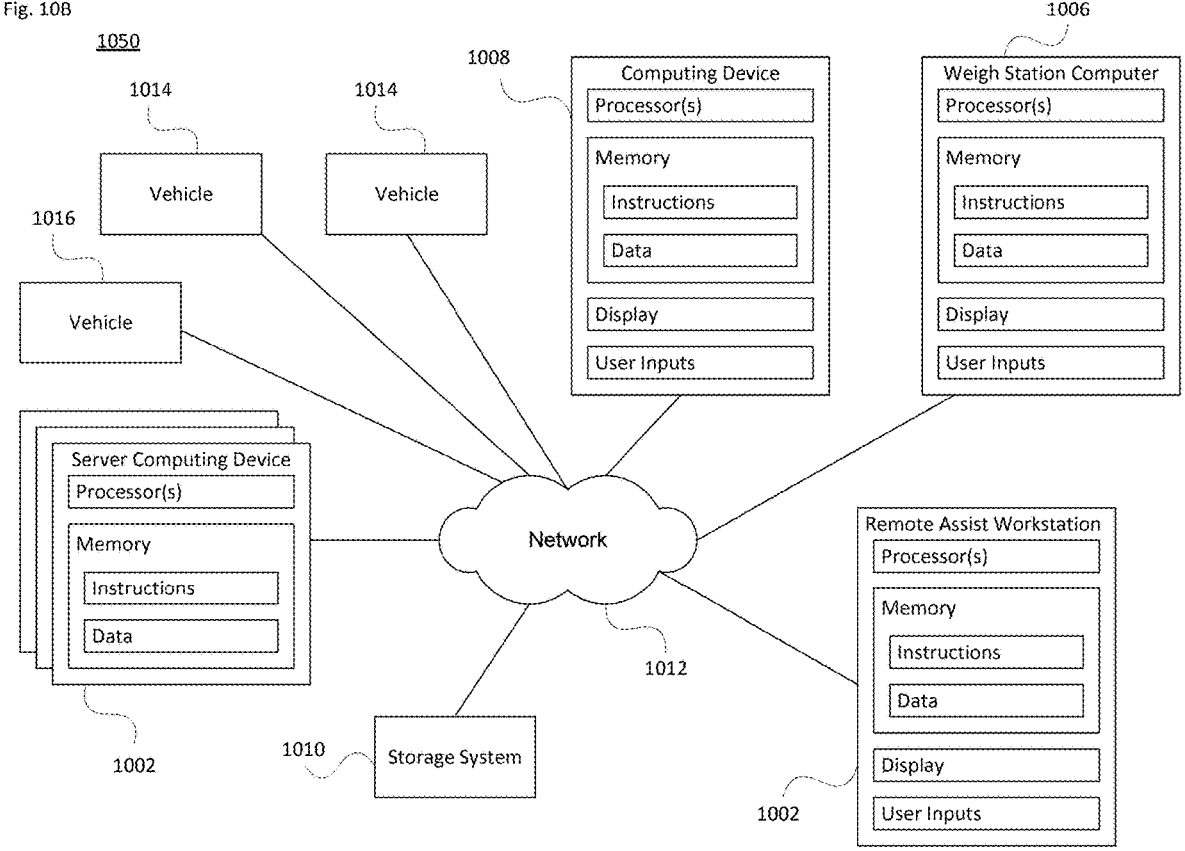

One example of information sharing is shown in FIGS. 10A and 10B. In particular, FIGS. 10A and 10B are pictorial and functional diagrams 1000 and 1050, respectively, of an example system that includes a plurality of computing devices 1002, 1004, 1006, 1008 and a storage system 1010 connected via a network 1012. The system also includes vehicles 1014 and 1016, which may be configured the same as or similarly to vehicles 100 and 120 of FIGS. 1A-B and 1C-1D. Vehicles 1014 and/or vehicles 1016 may be part of a fleet of vehicles. By way of example, vehicles 1014 are cargo vehicles configured to operate an autonomous driving mode. Although only a few vehicles and computing devices are depicted for simplicity, a typical system may include significantly more, such as dozens or hundreds.

As shown in FIG. 9B, each of computing devices 1002, 1004, 1006 and 1008 may include one or more processors, memory, data and instructions. Such processors, memories, data and instructions may be configured similarly to the ones described above with regard to FIG. 2A.

The various computing devices and vehicles may communicate via one or more networks, such as network 1012. The network 1012, and intervening nodes, may include various configurations and protocols including short range communication protocols such as Bluetooth™, Bluetooth™ LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 1002 may include one or more server computing devices having a plurality of computing devices, e.g., a load balanced server farm or cloud-based system, that exchange information with different nodes of a network for the purpose of receiving, processing and transmitting the data to and from other computing devices. For instance, computing device 1002 may include one or more server computing devices that are capable of communicating with the computing devices of vehicles 1014 and/or 1016, as well as computing devices 1004, 1006 and 1008 via the network 1012. For example, vehicles 1014 and/or 1016 may be a part of a fleet of vehicles that can be dispatched by a server computing device to various locations, and they may receive updated kinematic models to be used in maneuver and/or route planning. In this regard, the computing device 1002 may function as a dispatching server computing system which can be used to dispatch vehicles to different locations in order to pick up and deliver cargo or provide other services. The server computing device 1002 may also use network 1012 to communicate with a user of one of the other computing devices or a person of a vehicle, such as a driver of a vehicle operating in a semi-autonomous driving mode. In this regard, computing devices 1004, 1006 and 1008 may be considered client computing devices.

As shown in FIG. 10A each client computing device 1004, 1006 and 1008 may be a personal computing device intended for use by a respective user 1018, and have all of the components normally used in connection with a personal computing device including a one or more processors (e.g., a central processing unit (CPU)), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, touchscreen or microphone). The client computing devices may also include a camera for recording video streams, speakers, a network interface device, and all of the components used for connecting these elements to one another.

Although the client computing devices may each comprise a full-sized personal computing device, they may alternatively comprise mobile computing devices capable of wirelessly exchanging data with a server over a network such as the Internet. By way of example only, client computing devices 1006 and 1008 may be mobile phones or devices such as a wireless-enabled PDA, a tablet PC, a wearable computing device (e.g., a smartwatch), or a netbook that is capable of obtaining information via the Internet or other networks.

In some examples, client computing device 1004 may be a remote assistance workstation used by an administrator or operator to communicate with vehicles operating in an autonomous mode, drivers of lead vehicles, or passengers as discussed further below. Although only a single remote assistance workstation 1004 is shown in FIGS. 10A-10B, any number of such workstations may be included in a given system. Moreover, although workstation 1004 is depicted as a desktop-type computer, workstations 1004 may include various types of personal computing devices such as laptops, netbooks, tablet computers, etc.

Storage system 1010 can be of any type of computerized storage capable of storing information accessible by the server computing devices 1002, such as a hard-drive, memory card, ROM, RAM, DVD, CD-ROM, flash drive and/or tape drive. In addition, storage system 1010 may include a distributed storage system where data is stored on a plurality of different storage devices which may be physically located at the same or different geographic locations. Storage system 1010 may be connected to the computing devices via the network 1012 as shown in FIGS. 10A-10B, and/or may be directly connected to or incorporated into any of the computing devices.

Storage system 1010 may store various types of information. For instance, in addition to kinematic models for different types of vehicles, the storage system 1010 may also store autonomous vehicle control software which is to be used by vehicles, such as vehicles 1014 or 1016, to operate such vehicles in an autonomous driving mode as described above. This information may be retrieved or otherwise accessed by a server computing device, such as one or more server computing devices 1002, in order to perform some or all of the features described herein, including route planning. For instance, storage system 1010 may store real-time state information, received sensor data from one or more vehicles, roadgraph data (e.g., including trajectory information), driving regulation information for different jurisdictions, detailed kinematic models for different vehicles in a fleet, etc.

Figure 11:
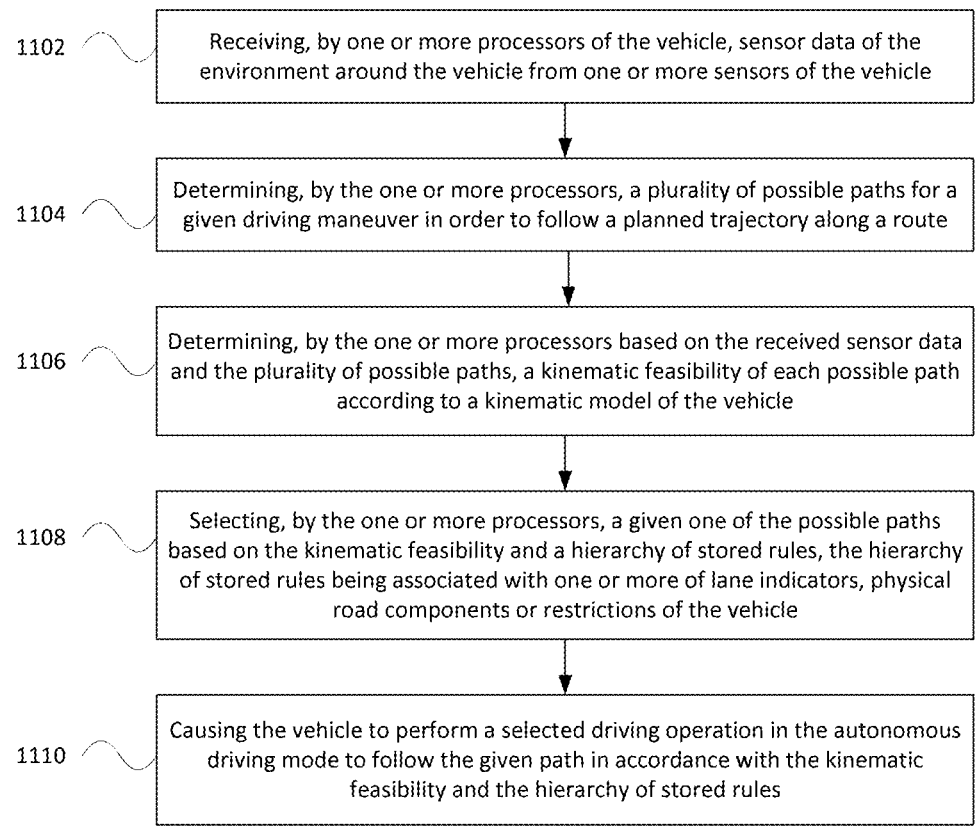
FIG. 11 illustrates a method in accordance with aspects of the disclosure.

FIG. 11 illustrates a method 1100 of operating a vehicle in an autonomous driving mode. At block 1102, the method includes receiving, by one or more processors of the vehicle, sensor data of the environment around the vehicle from one or more sensors of the vehicle. At block 1104, the one or more processors determine a plurality of possible paths for a given driving maneuver in order to follow a planned trajectory along a route. At block 1106, the one or more processors determine, based on the received sensor data and the plurality of possible paths, a kinematic feasibility of each possible path according to a kinematic model of the vehicle. At block 1108, the one or more processors select a given one of the possible paths based on the kinematic feasibility and a hierarchy of stored rules, the hierarchy of stored rules being associated with one or more of lane indicators, physical road components or restrictions of the vehicle. And at block 1110, the method includes causing the vehicle to perform a selected driving operation in the autonomous driving mode to follow the given path in accordance with the kinematic feasibility and the hierarchy of stored rules.

FIG. 12 illustrates a method 1200 of determining an overall route for a vehicle to operate in an autonomous driving mode. At block 1202, one or more processors of a computing system obtain at least one map comprising roadgraph information between a starting point and a destination of the overall route for the vehicle to operate in the autonomous driving mode. At block 1204, the one or more processors determine whether any segments of the overall route are restricted to the vehicle. At block 1206, the one or more processors determine an initial trajectory along the overall route based on determining whether any segments are restricted to the vehicle. At block 1208, the one or more processors determine, for the initial trajectory, a plurality of possible paths for a given driving maneuver by the vehicle. At block 1210, the one or more processors determine, based on the plurality of possible paths, a kinematic feasibility of each possible path according to a kinematic model of the vehicle. At block 1212, the one or more processors select a given one of the possible paths based on the kinematic feasibility and a hierarchy of rules. The hierarchy of rules are associated with one or more of lane indicators, physical road components or restrictions of the vehicle. At block 1214, the one or more processors generate a final trajectory for the vehicle based on the given path. And at block 1216 the final trajectory is stored in memory, for instance for later transmission to the vehicle.

The above approaches enable the onboard computer system to make real-time driving decisions based on the vehicle's kinematic model, map data and other information. For instance, the onboard system may evaluate a hierarchical set of rules of the road when selecting certain maneuvers. The above approaches also enable a back-end system to generate pre-planned routes that may be shared with one or more vehicles of a fleet. The routes may be updated or modified to select driving operations that are less kinematically challenging or are otherwise the most cost efficient.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples. Further, the same reference numbers in different drawings can identify the same or similar elements. The processes or other operations may be performed in a different order or simultaneously, unless expressly indicated otherwise herein.

The invention claimed is:

1. A method of operating a vehicle in an autonomous driving mode, the method comprising:
   receiving, by one or more processors of the vehicle, sensor data of the environment around the vehicle from one or more sensors of the vehicle;
   determining, by the one or more processors, a plurality of possible paths for a given driving maneuver in order to follow a planned trajectory along a route before determining a kinematic feasibility of each possible path;
   determining, by the one or more processors based on the received sensor data and the plurality of possible paths, the kinematic feasibility of each possible path according to a kinematic model of the vehicle;
   selecting, by the one or more processors, a given one of the possible paths based on the kinematic feasibility and a hierarchy of stored rules, the hierarchy of stored rules being associated with one or more of lane indicators, physical road components or restrictions of the vehicle; and
   causing the vehicle to perform a selected driving operation in the autonomous driving mode to follow the given path in accordance with the kinematic feasibility and the hierarchy of stored rules.

2. The method of claim 1, wherein the kinematic feasibility is determined according to a swept volume of the vehicle in accordance with each possible path.

3. The method of claim 2, wherein the swept volume includes one or more articulating sections of the vehicle.

4. The method of claim 1, wherein the hierarchy of stored rules ranks one or more of different lane line types, curb configurations or road shoulder types.

5. The method of claim 1, wherein selecting the given path based on the hierarchy of stored rules includes ranking paths based on expected violation of one or more of the rules.

6. The method of claim 1, wherein determining the kinematic feasibility of each possible path includes evaluating a maneuver cost associated with that path.

7. The method of claim 6, wherein evaluating the maneuver cost includes evaluating one or more of a number of turns, occlusions, weather limitations, neighborhood type or temporal restrictions.

8. The method of claim 6, wherein evaluating the maneuver cost includes analyzing a cost for missing a turn, missing an exit, or missing a lane change.

9. The method of claim 1, wherein selecting the given path is further based on a likelihood of the vehicle becoming stuck for one or more of the possible paths.

10. The method of claim 1, further comprising pre-planning for when to change lanes in advance of the selected driving operation.

11. A method of determining an overall route for a vehicle to operate in an autonomous driving mode, the method comprising:
- obtaining, by one or more processors of a computing system, at least one map comprising roadgraph information between a starting point and a destination of the overall route for the vehicle to operate in the autonomous driving mode;
- determining, by the one or more processors, whether the vehicle is restricted from traveling along any segments of the overall route;
- determining, by the one or more processors, an initial trajectory along the overall route based on determining whether the vehicle is restricted from traveling along any segments;
- determining, by the one or more processors for the initial trajectory, a plurality of possible paths for a given driving maneuver by the vehicle before determining a kinematic feasibility of each possible path;
- determining, by the one or more processors based on the plurality of possible paths, the kinematic feasibility of each possible path according to a kinematic model of the vehicle;
- selecting, by the one or more processors, a given one of the possible paths based on the kinematic feasibility and a hierarchy of rules, the hierarchy of rules being associated with one or more of lane indicators, physical road components or restrictions of the vehicle;
- generating, by the one or more processors, a final trajectory for the vehicle based on the given path; and
- transmitting the final trajectory to the vehicle for operating in the autonomous driving mode.

12. The method of claim 11, wherein determining the kinematic feasibility of each possible path includes evaluating at least one of a temporal restriction or a legal restriction.

13. The method of claim 12, wherein evaluating the temporal restriction includes estimating a likelihood that the vehicle will be able to perform a driving action prior to occurrence of the temporal restriction.

14. The method of claim 11, wherein determining the kinematic feasibility of each possible path includes evaluating a maneuver cost associated with that path.

15. The method of claim 14, wherein the maneuver cost is based on one or more of a number of turns, occlusions, weather limitations, neighborhood type or temporal restrictions.

16. The method of claim 14, wherein the maneuver cost includes a likelihood of the vehicle becoming stuck.

17. The method of claim 11, wherein the hierarchy of rules includes a set of rules relating to items or objects along a roadway.

18. The method of claim 17, wherein the items or objects include one or more of different lane line types, curb configurations or road shoulder types.

19. The method of claim 11, wherein selecting the given path based on the hierarchy of rules includes ranking paths based on expected violation of one or more rules in the hierarchy.

20. The method of claim 11, further comprising receiving information about restrictions or maneuver costs from one or more other vehicles that have driven along the overall route.

21. The method of claim 20, wherein receiving the information includes receiving information about actions either taken or attempted by a given vehicle.

22. The method of claim 20, wherein receiving the information includes receiving information observed by a given vehicle about an action taken by a different vehicle.

23. The method of claim 11, wherein determining whether the vehicle is restricted from traveling along any segments includes determining whether the segments are legally restricted to the vehicle.

* * * * *